United States Patent
Chen et al.

(10) Patent No.: US 10,833,600 B2
(45) Date of Patent: Nov. 10, 2020

(54) SINGLE-STAGE MULTI-INPUT FORWARD DC-DC CHOPPER TYPE HIGH-FREQUENCY LINK'S INVERTER WITH SERIES SIMULTANEOUS POWER SUPPLY

(71) Applicant: Qingdao University, Qingdao (CN)

(72) Inventors: Daolian Chen, Qingdao (CN); Jiahui Jiang, Qingdao (CN)

(73) Assignee: QINGDAO UNIVERSITY, Qingdao (CN)

(*) Notice: Subject to any disclaimer, the term of this patent is extended or adjusted under 35 U.S.C. 154(b) by 0 days.

(21) Appl. No.: 16/622,278

(22) PCT Filed: Dec. 6, 2018

(86) PCT No.: PCT/CN2018/000410
§ 371 (c)(1),
(2) Date: Dec. 12, 2019

(87) PCT Pub. No.: WO2019/136576
PCT Pub. Date: Jul. 18, 2019

(65) Prior Publication Data
US 2020/0127581 A1    Apr. 23, 2020

(30) Foreign Application Priority Data
Jan. 9, 2018    (CN) .......................... 2018 1 0029372

(51) Int. Cl.
*H02M 7/00*    (2006.01)
*H02M 7/48*    (2007.01)

(52) U.S. Cl.
CPC ....... *H02M 7/4826* (2013.01); *H02M 7/4807* (2013.01)

(58) Field of Classification Search
CPC ............. H02M 7/4826; H02M 7/4807; H02M 7/5395; H02M 2001/342; H02M 2001/348; H02M 7/10; H02M 7/515; H02M 3/338
See application file for complete search history.

(56) References Cited

U.S. PATENT DOCUMENTS

| | | | | |
|---|---|---|---|---|
| 5,321,397 A | * | 6/1994 | Stone | G06K 9/50 341/59 |
| 5,434,770 A | * | 7/1995 | Dreifuerst | H02J 1/102 363/136 |
| 5,587,892 A | * | 12/1996 | Barrett | H02M 3/337 363/44 |

FOREIGN PATENT DOCUMENTS

| CN | 101552569 A | 10/2009 |
|---|---|---|
| CN | 108173441 A | 6/2018 |

OTHER PUBLICATIONS

Qiu, Yanhui et al., Development and Present Status of Multi-Energy Distributed Power Generation System, 2016 IEEE 8th International Power Electronics and Motion Control Conference, 2016.

* cited by examiner

*Primary Examiner* — Jeffrey A Gblende
*Assistant Examiner* — Afework S Demisse
(74) *Attorney, Agent, or Firm* — Bayramoglu Law Offices LLC

(57) ABSTRACT

A single-stage multi-input forward DC-DC chopper type high-frequency link's inverter with series simultaneous power supply includes a multi-input single-output combined isolated bidirectional forward DC-DC chopper, a plurality of input filters connected to non-common ground and a common output filter circuit. The plurality of input filters and the output filter circuit are connected by the multi-input single-output combined isolated bidirectional forward DC-DC chopper. Each input end of the multi-input single-output combined isolated bidirectional forward DC-DC chopper is connected to output ends of each input filter in a one-to-one correspondence. The output ends of the multi-input single-output combined isolated bidirectional forward DC-DC chopper are connected to the output filter circuit. The inverter has multiple input sources connected to non-com- (Continued)

mon ground, the power is supplied in a time-sharing or simultaneous manner, a high-frequency electrical isolation is performed between the output and the input.

2 Claims, 14 Drawing Sheets

SINGLE-STAGE MULTI-INPUT FORWARD DC-DC CHOPPER TYPE HIGH-FREQUENCY LINK'S INVERTER WITH SERIES SIMULTANEOUS POWER SUPPLY

CROSS REFERENCE TO THE RELATED APPLICATIONS

This application is the national phase entry of International Application No. PCT/CN2018/000410, filed on Dec. 6, 2018, which is based upon and claims priority to Chinese Patent Application No. 201810029372.5, filed on Jan. 9, 2018, the entire contents of which are incorporated herein by reference.

TECHNICAL FIELD

The present disclosure relates to a single-stage multi-input forward DC-DC chopper type high-frequency link's inverter with series simultaneous power supply and pertains to the technology of power electronic conversion.

BACKGROUND

The inverter is a static converter device for converting unstable and inferior DC power into stable and high-quality alternating current (AC) power by using power semiconductor devices, which is supplied for AC load or realizes AC grid-connection. A low-frequency electrical isolation inverter or a high-frequency electrical isolation inverter, which is respectively referred to as a low-frequency link's inverter or a high-frequency link's inverter, is provided between an output AC load or AC grid and input DC power. The electrical isolation element mainly plays the following roles in the inverter. (1) Realizing the electrical isolation between the output and the input of the inverter, and improving the safety, reliability and electromagnetic compatibility in the course of the operation of the inverter are improved. (2) Matching between the output voltage and the input voltage of the inverter, which realizes the technical effect that the output voltage of the inverter is higher than, equal to or lower than the input voltage so as to greatly broaden the application range of the inverter. (3) Greatly diminishing the volume and weight of the transformer and eliminating the audio noise when the operating frequency of the high-frequency transformer or the high-frequency energy storage transformer is over 20 kHz. Therefore, in the case of secondary power conversion of DC power sources, such as DC generators, accumulators, photovoltaic cells and fuel cells, the inverter is important in applications.

New energy sources (also known as green energy sources) such as solar energy, wind energy, tidal energy and geothermal energy have the advantages of being clean, pollution-free, cheap, reliable, and rich. Thus, the application prospects thereof is vast. Since the traditional fossil energy (non-renewable energy sources) such as petroleum, coal and natural gas have become gradually insufficient and cause severe environmental pollution and global warming, and also since the nuclear energy production causes nuclear waste and environmental pollution, people have increasingly focused on the development and utilization of new energy sources. New energy power generation mainly includes photovoltaics, wind power, fuel cells, hydraulic power and geothermal heat, etc., all of which have defects. For instance, the power supply is unstable, unsustainable, and varies with climatic conditions. Therefore, it is imperative to use a distributed power supply system collectively supplied by various new energy sources.

The traditional new energy distributed power supply system, as shown in FIG. 1, and FIG. 2, usually uses a plurality of single-input DC-DC converters to respectively perform an electric energy conversion on new energy power generation equipment without the need to store the energy, such as photovoltaic cells, fuel cells, wind driven generators, through a unidirectional DC-DC converter. Moreover, the output ends are in parallel or in series and then connect to the DC bus of the common inverter for ensuring the cooperative power supply and the coordinative work of various new energy sources. The distributed generation system realizes that a plurality of input sources simultaneously supply power for the load and the preferential utilization of the energy, which enhances the stability and flexibility of the system. Nevertheless, there are defects such as two-stage power conversion, low power density, low conversion efficiency and high cost, and the like, thereby limiting the practicality thereof to a great extent.

In order to simplify the circuit structure and reduce the power conversion stage, a novel multi-input inverter with a single-stage circuit structure as shown in FIG. 3 is used to replace the traditional multi-input inverter having a two-stage cascade circuit structure of DC-DC converters and an inverter as shown in FIGS. 1 and 2, to constitute a novel single-stage new energy distributed power supply system. The single-stage multi-input inverters allow inputting various new energy sources and the input energy sources may have the same or greatly different properties, amplitudes, and characteristics. The novel single-stage new energy distributed power supply system has the advantages that the system has a simple circuit structure and a single-stage power conversion; a plurality of input sources supply power to the load simultaneously or in a time-sharing manner in a high-frequency switching period; and the cost is low.

Therefore, it is urgent to actively seek a kind of single-stage multi-input inverter allowing various new energy sources to collectively supply power and a new energy distributed power supply system thereof, which is of great significance to improving the stability and flexibility of the system and realizing the preferential or full utilization of new energy sources.

SUMMARY

The objective of the present disclosure is to provide a single-stage multi-input forward DC-DC chopper type high-frequency link's inverter with series simultaneous power supply having the characteristics of various new energy sources cooperatively supply power, the input DC power supplies are not connected to common ground, multi-input single-output combined isolated bidirectional forward DC-DC chopper is provided with multi-path series simultaneous select switch, there is the high-frequency isolation between the output and the input, a plurality of power supplies supply power to the load in a time-sharing or simultaneous manner, the circuit topology is simple, there is single-stage power conversion, the conversion efficiency is high, the output waveform is high-quality, the output capacity is medium and large and having broad application prospects, etc.

The technical solution of the present disclosure is as follows. The single-stage multi-input forward DC-DC chopper type high-frequency link's inverter with series simultaneous power supply is composed of a plurality of input filters connected to non-common ground and a common output filter circuit, which are connected by a multi-input single-output combined isolated bidirectional forward DC-DC chopper. Each input end of the multi-input single-output combined isolated bidirectional forward DC-DC chopper is connected to the output end of each input filter in a one-to-one correspondence. The output end of the multi-input single-output combined isolated bidirectional forward DC-DC chopper is connected to the output filter circuit. The multi-input single-output combined isolated bidirectional forward DC-DC chopper is composed of a multi-path series simultaneous select power switch circuit whose output ends are connected in inward series, and a single-input single-output combined isolated bidirectional forward DC-DC chopper successively connected in cascade. Each path of the series simultaneous select power switch circuits is composed of a two-quadrant power switch configured to withstand a unidirectional voltage stress and a bidirectional current stress and a power diode and the source electrode of the two-quadrant power switch is connected to the cathode of the power diode. The drain electrode of the two-quadrant power switch and the anode of the power diode are respectively the positive input end and the negative input end of the series simultaneous select power switch circuit. The source electrode of the two-quadrant power switch and the anode of the power diode are respectively the positive output end and the negative output end of the series simultaneous select power switch circuit. The single-input single-output combined isolated bidirectional forward DC-DC chopper is composed of two identical isolated bidirectional forward DC-DC choppers, which respectively output a low-frequency positive half cycle unipolar pulse width modulated voltage wave and a low-frequency negative half cycle unipolar pulse width modulated voltage wave, wherein the input ends of the two isolated bidirectional forward DC-DC choppers are connected in parallel and output ends of the two isolated bidirectional forward DC-DC choppers are connected in series-opposing connection and two non-series output ends of the two isolated bidirectional forward DC-DC choppers are the output ends of the multi-input single-output combined isolated bidirectional forward DC-DC chopper. Each isolated bidirectional forward DC-DC chopper is composed of a two-quadrant high-frequency inverter switch, a high-frequency transformer and a high-frequency rectifier formed by a two-quadrant high-frequency power switch for rectification, freewheeling, polarity selection, which are connected successively in cascade; output ends of each of the two isolated bidirectional forward DC-DC choppers are connected in parallel to an active clamp circuit to suppress a voltage spike of a high-frequency rectifier power switch, wherein the active clamp circuit is composed of a clamp switch and a clamp capacitor. The output filter circuit is composed of a filter inductor and a filter capacitor, which are connected successively in cascade; or composed of a filter inductor, a filter capacitor, and a filter inductor, which are connected successively in cascade; the two identical isolated bidirectional forward DC-DC choppers operate in turn for half a low-frequency cycle in a low-frequency output voltage cycle, a first isolated bidirectional forward DC-DC chopper of the two identical isolated bidirectional forward DC-DC choppers operates to output a low-frequency half cycle, a second isolated bidirectional forward DC-DC chopper of the two identical isolated bidirectional forward DC-DC choppers stops working, and the two-quadrant power switch for a polarity selection is turned on; a high-frequency inverter switch in the multi-input single-output combined isolated bidirectional forward DC-DC chopper of the single-stage multi-input forward DC-DC chopper type high-frequency link's inverter modulates multi-path input DC voltage sources $U_{i1}$, $U_{i2}$, ..., $U_{in}$ into bipolar three-state multi-level SPWM voltage waves; the bipolar three-state multi-level SPWM voltage waves are isolated by the high-frequency transformer and are rectified by the high-frequency rectifier into unipolar three-state multi-level SPWM voltage waves, to obtain a high-quality sinusoidal AC voltage or a sinusoidal AC on a single-phase AC passive load or a single-phase AC grid after being filtered by an output LC filter; when an energy is transferring forward, an amplitude of the bipolar three-state multi-level SPWM voltage waves is $\pm(U_{i1}+U_{i2}+\ldots+U_{in})N_2/N_1$, $\pm(U_{i1}+U_{i2}+\ldots+U_{in-1})N_2/N_1$, ..., $\pm U_{i1}N_2/N_1$, an amplitude of the unipolar three-state multi-level SPWM voltage waves is $(U_{i1}+U_{i2}+\ldots+U_{in})N_2/N_1$, $(U_{i1}+U_{i2}+\ldots+U_{in-1})N_2/N_1$, ..., $U_{i1}N_2/N_1$, wherein n represents a path number of a plurality of input sources, $N_1$ and $N_2$ represent turns of a primary winding of the high-frequency transformer and turns of a secondary winding of the high-frequency transformer, respectively; n is a natural number greater than 1; a relationship between an output voltage $u_o$ and the multi-path input DC voltage sources, a turns ratio $N_2/N_1$ of the high-frequency transformer, and duty cycles $d_1, d_2, \ldots, d_n$ of multi-path series simultaneous select power switches $S_{s1}, S_{s2}, \ldots, S_{sn}$ is $u_o=(d_1U_{i1}+d_2U_{i2}+\ldots+d_nU_{in})N_2/N_1$; a circuit topology of the single-stage multi-input forward DC-DC chopper type high-frequency link's inverter with series simultaneous power supply comprises a single-transistor forward DC-DC chopper type circuit, a push-pull full-wave DC-DC chopper type circuit, a push-pull bridge DC-DC chopper type circuit, a push-pull forward full-wave DC-DC chopper type circuit, a push-pull forward bridge DC-DC chopper type circuit, a double-transistor forward DC-DC chopper type circuit, a half-bridge full-wave DC-DC chopper type circuit, a half-bridge DC-DC chopper type circuit, a full-bridge full-wave DC-DC chopper type circuit, and a full-bridge DC-DC chopper type circuit; the double-transistor forward DC-DC chopper type circuit is composed of n+8 two-quadrant high-frequency power switches configured to withstand the unidirectional voltage stress and the bidirectional current stress, and n+4 diodes; the single-transistor forward DC-DC chopper type circuit is composed of n+6 two-quadrant high-frequency power switches configured to withstand the unidirectional voltage stress and the bidirectional current stress and n diodes; the push-pull full-wave DC-DC chopper type circuit is composed of n+8 two-quadrant high-frequency power switches configured to withstand the unidirectional voltage stress and the bidirectional current stress and n diodes; the push-pull bridge DC-DC chopper type circuit is composed of n+12 two-quadrant high-frequency power switches configured to withstand the unidirectional voltage stress and the bidirectional current stress and n diodes; the push-pull forward full-wave DC-DC chopper type circuit is composed of n+8 two-quadrant high-frequency power switches configured to withstand the unidirectional voltage stress and the bidirectional current stress and n diodes; the push-pull forward bridge DC-DC chopper type circuit is composed of n+12 two-quadrant high-frequency power switches configured to withstand the unidirectional voltage stress and the bidirectional current stress and n diodes; the half-bridge full-wave DC-DC chopper type circuit is composed of n+8 two-quadrant high-frequency power switches configured to withstand the unidirectional voltage stress and the bidirectional current stress and n diodes; the half-bridge DC-DC chopper type circuit is composed of n+12 two-quadrant high-frequency power switches configured to withstand the unidirectional voltage stress and the bidirectional current stress and n diodes; the full-bridge full-wave DC-DC chopper type circuit is composed of n+12 two-quadrant high-frequency power switches configured to withstand the unidirectional voltage stress and the bidirectional current stress and n diodes; and the full-bridge DC-DC chopper type circuit is composed of n+16 two-quadrant high-frequency power switches configured to withstand the unidirectional voltage stress and the bidirectional current stress and n diodes; an independent power supply system formed by the single-stage multi-input forward DC-DC chopper type high-frequency link's inverter with series simultaneous power supply employs an energy management control strategy of the output voltage and input current instantaneous value SPWM master-slave power distribution, wherein an output power of the $1^{st}$, $2^{nd}$, ..., $(n-1)^{th}$ path input sources is fixed and the $n^{th}$ path input source supplies insufficient power needed by a load; a grid-connected power supply system formed by the single-stage multi-input forward DC-DC chopper type high-frequency link's inverter with series simultaneous power supply employs an energy management control strategy of an input current instantaneous value SPWM maximum power output of the $1^{st}$, $2^{nd}$, ..., $n^{th}$ path input sources; the single-stage multi-input forward DC-DC chopper type high-frequency link's inverter with series simultaneous power supply inverts a plurality of unstable input DC voltages connected to the non-common ground into a stable and high-quality output AC needed by the load, the plurality of input sources all supply power to an output AC load in a high-frequency switching period, and the plurality of input sources are connected in series to simultaneously supply power to the output AC load in the high-frequency switching period.

In the present disclosure, the multi-input inverter circuit structure is formed by connecting the DC-DC converter and the inverter of the traditional multiple new energy combined power supply system in two-stage cascade, thereby establishing a circuit structure of a single-stage multi-input inverter with a novel series simultaneous select switch and providing the circuit structure and topologic family of the single-stage multi-input forward DC-DC chopper type high-frequency link's inverter with series simultaneous power supply and the energy management control strategy thereof. Namely, the circuit structure is formed by connecting the plurality of non-common-ground input filters and the common output filter circuit through the multi-input single-output combined isolated bidirectional forward DC-DC chopper.

The single-stage multi-input forward DC-DC chopper type high-frequency link's inverter with series simultaneous power supply of the present disclosure can invert a plurality of unstable input DC voltages connected to non-common ground into a stable and high-quality output AC needed by the load and has the following characteristics. The multi-input DC power supplies are connected to non-common ground, there is high-frequency isolation between the output and the input, multi-input power supplies supply power to the load in a time-sharing or simultaneous manner, the circuit topology is simple, there is single-stage power conversion, the conversion efficiency is high, the output waveform is high-quality, the output capacity is medium and large and the prospects for applications are vast. The comprehensive performance of the single-stage multi-input forward DC-DC chopper type high-frequency link's inverter with series simultaneous power supply is superior to the traditional multi-input inverter formed by the DC-DC converter and the inverter in two-stage cascade.

DETAILED DESCRIPTION OF THE EMBODIMENTS

Figure 1:
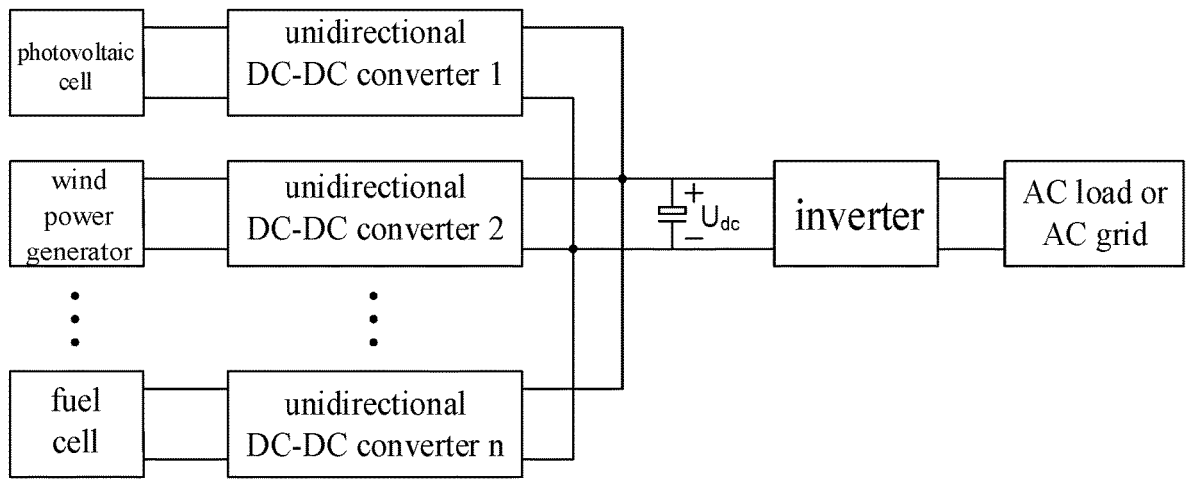
FIG. 1 shows a traditional two-stage new energy source distributed power supply system with output ends of multiple unidirectional DC-DC converters connected in parallel.
Figure 2:
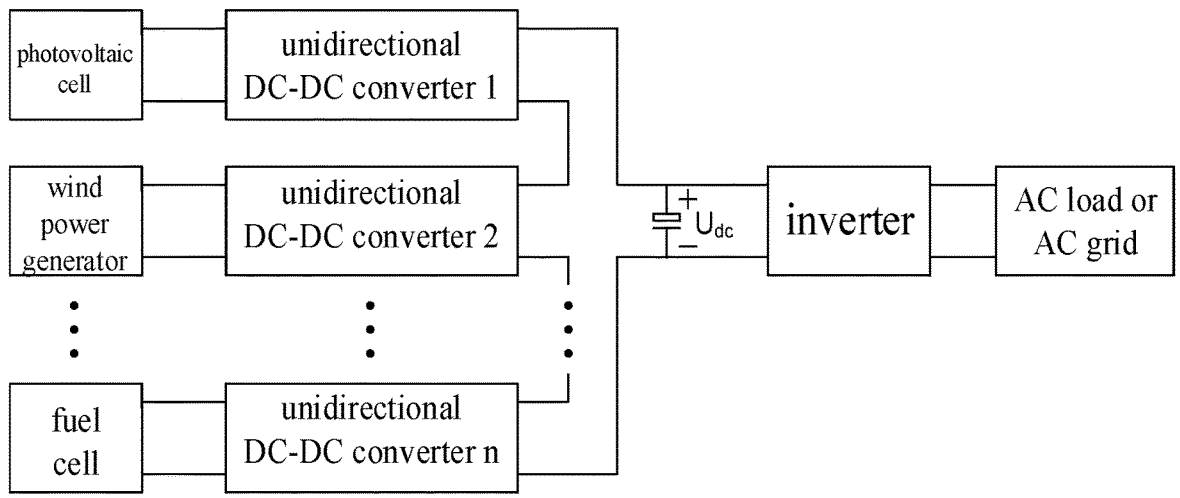
FIG. 2 shows a traditional two-stage new energy source distributed power supply system with output ends of multiple unidirectional DC-DC converters connected in series.
Figure 3:
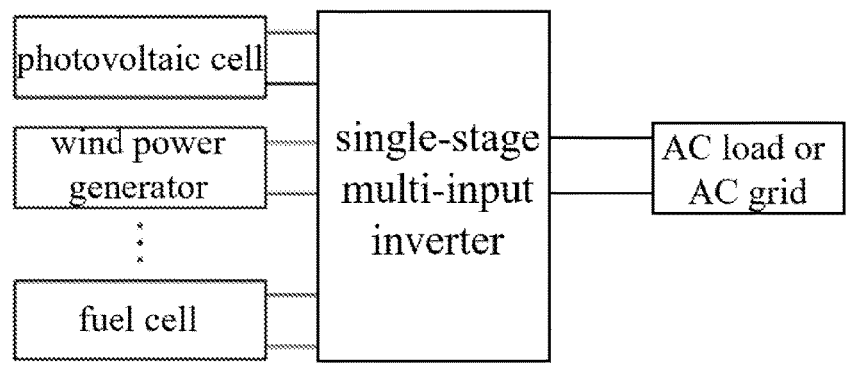
FIG. 3 shows a schematic block diagram of a novel single-stage multi-input inverter.

The technical solutions of the present disclosure are further described hereinafter with the drawings and the embodiments.

The single-stage multi-input forward DC-DC chopper type high-frequency link's inverter with series simultaneous power supply is composed of a plurality of input filters connected to non-common ground and a common output filter circuit, which are connected by a multi-input single-output combined isolated bidirectional forward DC-DC chopper. Each input end of the multi-input single-output combined isolated bidirectional forward DC-DC chopper is connected to the output ends of each input filter in a manner of one-to-one correspondence. The output end of the multi-input single-output combined isolated bidirectional forward DC-DC chopper is connected to the output filter circuit. The multi-input single-output combined isolated bidirectional forward DC-DC chopper is composed of a multi-path series simultaneous select power switch circuit whose output ends are connected in inward series and a single-input single-output combined isolated bidirectional forward DC-DC chopper, which are successively connected in cascade. Each path of the series simultaneous select power switch circuits is composed of a two-quadrant power switch and a power diode. The source electrode of the two-quadrant power switch is connected to the cathode of the power diode. The drain electrode of the two-quadrant power switch and the anode of the power diode are respectively the positive input end and the negative input end of the series simultaneous select power switch circuits. The source electrode of the two-quadrant power switch and the anode of the power diode are respectively the positive output end and the negative output end of the series simultaneous select power switch circuits. The single-input single-output combined isolated bidirectional forward DC-DC chopper is composed of two identical isolated bidirectional forward DC-DC choppers, which respectively output a low-frequency positive half cycle unipolar pulse width modulated voltage wave and a low-frequency negative half cycle unipolar pulse width modulated voltage wave, wherein the input ends of the two isolated bidirectional forward DC-DC choppers are connected in parallel and output ends of the two isolated bidirectional forward DC-DC choppers are connected in series-opposing connection. Two non-series output ends of the two isolated bidirectional forward DC-DC choppers are the output ends of the multi-input single-output combined isolated bidirectional forward DC-DC chopper. Each isolated bidirectional forward DC-DC chopper is composed of a two-quadrant high-frequency inverter switch, a high-frequency transformer and a high-frequency rectifier formed by a two-quadrant high-frequency power switch for rectification, freewheeling and polarity selection, which are successively connected in cascade. The output filter circuit is composed of a filter inductor and a filter capacitor, which are successively connected in cascade; or composed of a filter inductor, a filter capacitor, and a filter inductor, which are successively connected in cascade.

Figure 4:
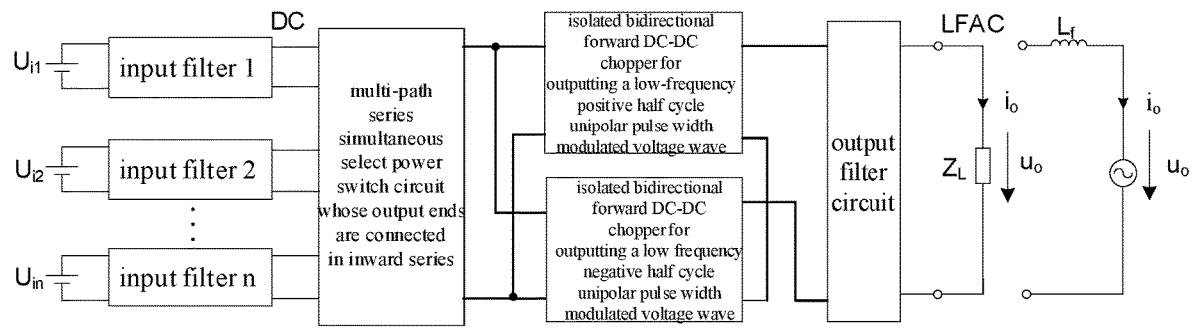
FIG. 4 shows a schematic block diagram of a single-stage multi-input forward DC-DC chopper type high-frequency link's inverter with series simultaneous power supply.
Figure 5:
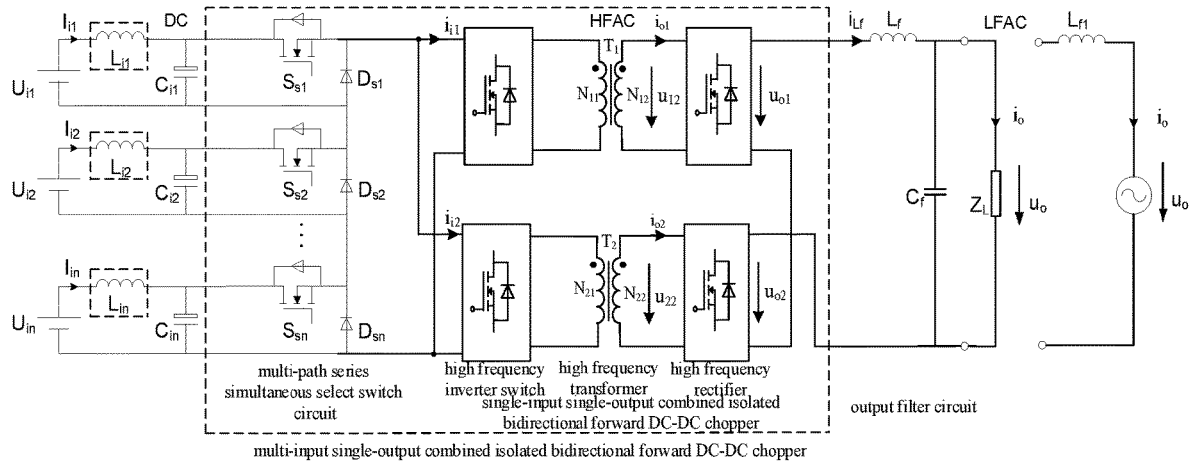
FIG. 5 shows a circuit structure diagram of the single-stage multi-input forward DC-DC chopper type high-frequency link's inverter with series simultaneous power supply.
Figure 6:
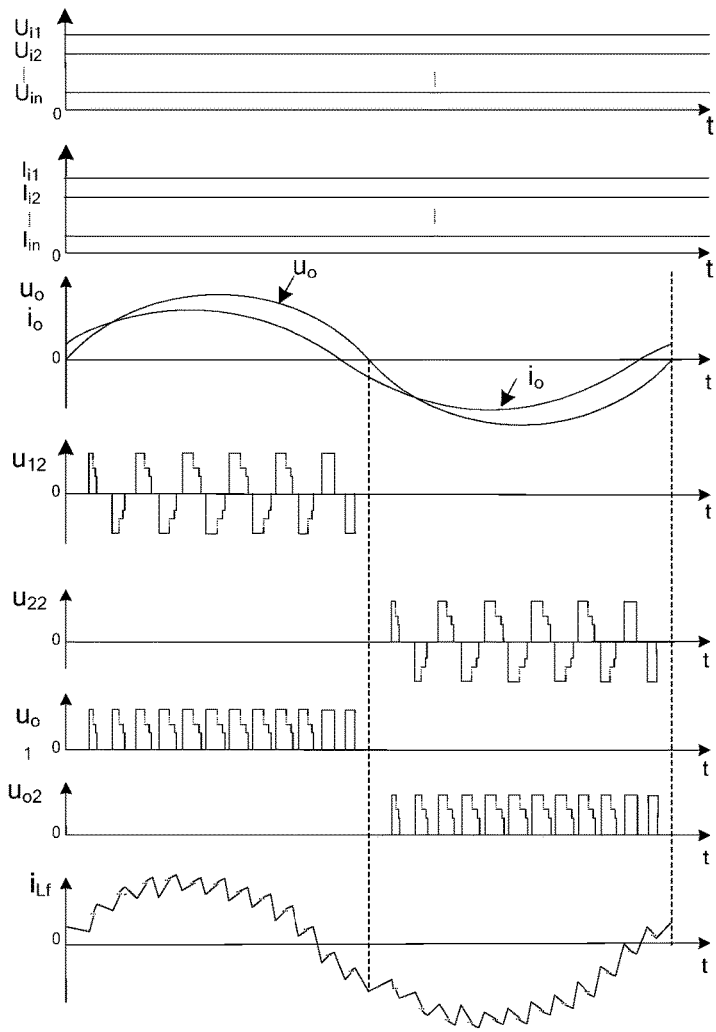
FIG. 6 shows a steady-state schematic waveform diagram of the single-stage multi-input forward DC-DC chopper type high-frequency link's inverter with series simultaneous power supply controlled by the output voltage instantaneous value sinusoidal pulse width modulation (SPWM).

The schematic block diagram, circuit structure, steady-state schematic oscillogram controlled by the output voltage instantaneous value SPWM of the single-stage multi-input forward DC-DC chopper type high-frequency link's inverter with series simultaneous power supply are respectively shown in FIGS. 4, 5 and 6. In FIGS. 4, 5, and 6, $U_{i1}$, $U_{i2}$, ..., $U_{in}$ are the input DC voltage sources of the n paths (n is a natural number greater than 1), $Z_L$ is a single-phase output AC load, and $u_o$, $i_o$ are respectively the single-phase output AC voltage (is composed of AC grid voltage) and the AC. The n-input single-output combined isolated bidirectional forward DC-DC chopper is composed of multi-path series simultaneous select power switch circuit whose output ends are connected in inward series, and the single-input single-output combined isolated bidirectional forward DC-DC chopper, which are successively connected in cascade, and at any time is equivalent to a bidirectional power flow single-input single-output combined isolated bidirectional forward DC-DC chopper. Specifically, the multi-path series simultaneous select power switch circuit whose output ends are connected in inward series is composed of n two-quadrant high-frequency power select switches $S_{s1}$, $S_{s2}$, ..., $S_{sn}$, which are capable of withstanding unidirectional voltage stress and bidirectional current stress, and n select diodes $D_{s1}$, $D_{s2}$, ..., $D_{sn}$ (the power select switches $S_{s1}$, $S_{s2}$, ..., $S_{sn}$ are simultaneously turned on or have a phase difference and the switching frequency are identical or different, but the present embodiment only describes the control modes in which $S_{s1}, S_{s2}, \ldots, S_{sn}$ have the same switching frequency and are simultaneously turned on). The single-input single-output combined isolated bidirectional forward DC-DC chopper is composed of two identical isolated bidirectional forward DC-DC choppers that respectively output a low-frequency positive half cycle unipolar pulse width modulated voltage wave $u_{o1}$ and a low-frequency negative half cycle unipolar pulse width modulated voltage wave $u_{o2}$, wherein the input ends of the two isolated bidirectional forward DC-DC choppers are connected in parallel and the output ends of the two isolated bidirectional forward DC-DC choppers are connected in series-opposing connection. The two isolated bidirectional forward DC-DC choppers operate in turn for half a low-frequency cycle in a low-frequency output voltage cycle. Namely, when one DC-DC chopper operates to output a low-frequency positive half cycle of $u_{o1}$, and the other DC-DC chopper stop working and the two-quadrant power switch for polarity selection is turned on, $u_{o2}=0$, after passing through the output filter, the positive half cycle of the sinusoidal AC $u_o$, $i_o$ is output. In contrast, when one DC-DC chopper operates to output a low-frequency negative half cycle of $u_{o2}$, and the other DC-DC chopper stops working and the two-quadrant power switch for polarity select is turned on, $u_{o1}=0$, after passing through the output filter, the negative half cycle of the sinusoidal AC $u_o$, $i_o$ is output. Moreover, the two non-series output ends of the two isolated bidirectional forward DC-DC choppers are the output ends of the multi-input single-output combined isolated bidirectional forward DC-DC chopper. Each the isolated bidirectional forward DC-DC chopper is composed of a two-quadrant high-frequency inverter switch, a high-frequency transformer and a high-frequency rectifier formed by a two-quadrant high-frequency power switch for rectification, freewheeling and polarity select, which are successively connected in cascade, and MOSFET, IGBT, GTR and other power devices can be selected. The output filter circuit is composed of a filter inductor and a filter capacitor which are successively connected in cascade, or composed of a filter inductor, a filter capacitor, and a filter inductor which are successively connected in cascade, as shown in the circuit diagrams in which the two cases respectively show the output LC filter for passive AC load and the output LCL filter for AC grid load. The input filter of the n paths is the LC filter (i.e. the filter inductors $L_{i1}, L_{i2}, \ldots, L_{in}$, with the added dashed block) or a capacitor filter (i.e. the filter inductors $L_{i1}, L_{i2}, \ldots, L_{in}$ without the added dashed block). When using the LC filter, the n paths input DC will be smoother. The high-frequency inverter switch in the n-input single-output combined isolated bidirectional forward DC-DC chopper modulates the n paths input DC voltage sources $U_{i1}, U_{i2}, \ldots, U_{in}$ into the bipolar three-state multi-level SPWM voltage waves $u_{12}N_1/N_2$, $u_{22}N_1/N_2$. The unipolar three-state multi-level SPWM voltage wave $u_{o1}, u_{o2}$ are obtained after being isolated by the transformer $T_1, T_2$ and being rectified by the high-frequency rectifier. The high-quality sinusoidal AC voltage $u_o$ or sinusoidal AC $i_o$ are obtained on the single-phase AC passive load or the single-phase AC grid after being filtered by the output LC filter. The smooth input DCs $I_{i1}, I_{i2}, \ldots, I_{in}$ are obtained in n paths of the input DC power supplies $U_{i1}, U_{i2}, \ldots, U_{in}$ after n input pulse currents of n-input single-output combined isolated bidirectional forward DC-DC chopper are filtered by the input filter $L_{i1}$-$C_{i1}$, $L_{i2}$-$C_{i2}, \ldots, L_{in}$-$C_{in}$ or $C_{i1}, C_{i2}, \ldots, C_{in}$. Assuming that the turns of the primary winding of the high-frequency transformer $N_{11}=N_{21}=N_1$, the turns of the secondary winding $N_{12}=N_{22}=N_2$, when $i_{Lf} \times U_o > 0$, the energy is transferring forward, the amplitude of the bipolar three-state multi-level SPWM voltage waves $u_{12}, u_{22}$ is $\pm(U_{i1}+U_{i2}+\ldots+U_{in})N_2/N_1$, $\pm(U_{i1}+U_{i2}+\ldots+U_{in-1})N_2/N_1, \ldots, \pm U_{i1}N_2/N_1$, the amplitude of the unipolar three-state multi-level SPWM voltage wave $u_{o1}, u_{o2}$ is $(U_{i1}+U_{i2}+\ldots+U_{in})N_2/N_1$, $(U_{i1}+U_{i2}+\ldots+U_{in-1})N_2/N_1, \ldots, U_{i1}N_2/N_1$. When $i_{Lf} \times u_o < 0$, the energy is fed back to the input power supply side, the amplitude of $u_{12}$ and $u_{22}$ is $\pm(U_{i1}+U_{i2}+\ldots+U_{in})N_2/N_1$ and the amplitude of $u_{o1}, u_{o2}$ is $(U_{i1}+U_{i2}+\ldots+U_{in})N_2/N_1$.

The single-stage multi-input forward DC-DC chopper type high-frequency link's inverter with series simultaneous power supply belongs to a buck inverter. The n input sources supply power to the load in a time-sharing or simultaneous manner, which is equivalent to the superposition of the voltage at the output of multiple buck type single-input inverters in theory. Assuming the power select switches $S_{s1}, S_{s2}, \ldots, S_{sn}$ to have the same switching frequency and are turn on simultaneously, the duty cycles are respectively $d_1, d_2, \ldots, d_n$, wherein $d_1 > d_2 > \ldots > d_n$, then the relationship between the output voltage $u_o$ and the input DC voltage ($U_{i1}, U_{i2}, \ldots, U_{in}$), the turns ratio ($N_2/N_1$) of the high-frequency transformer, the duty cycle ($d_1, d_2, \ldots, d_n$) is $u_o=(d_1U_{i1}+d_2U_{i2}+\ldots+d_nU_{in})N_2/N_1$. When the duty cycles ($d_1, d_2, \ldots, d_n$) and the high-frequency transformer turns ratio ($N_2/N_1$) are appropriate, $u_o$ can be greater than, equal to, or less than the sum of the input DC voltages $U_{i1}+U_{i2}+\ldots+U_{in}$. The high-frequency transformer in the inverter not only improves the safe reliability and electromagnetic compatibility of the inverter operation, but also plays an important role in matching the output voltage and the input voltage. Namely, achieving the technical effect that the output voltage of the inverter is higher than, equal to or lower than the sum of the input DC voltages $U_{i1}+U_{i2}+\ldots+U_{in}$, and greatly broadens the application range thereof. If $0<d_1<1$, $u_o<(U_{i1}+U_{i2}+\ldots+U_{in})N_2/N_1$, the output voltage $u_o$ is always lower than the sum of the products $(U_{i1}+U_{i2}+\ldots+U_{in})N_2/N_1$ of the input DC voltage ($U_{i1}, U_{i2}, \ldots, U_{in}$) and the turns ratio ($N_2/N_1$) of the high-frequency transformer. Since the inverter belongs to a single-stage circuit structure, and the working frequency of the transformer is high-frequency, and the multi-input single-output combined isolated bidirectional forward DC-DC chopper is provided with the multi-path series simultaneous select switch whose output ends are connected in inward series, therefore, this kind of inverter is referred to as the single-stage multi-input forward DC-DC chopper type (buck type) high-frequency link's inverter with series simultaneous power supply. The n input sources of the inverter supply power to the output AC load in a time-sharing or simultaneous manner, and the duty cycles may be the same ($d_1=d_2=\ldots=d_n$) or different ($d_1 \neq d_2 \neq \ldots \neq d_n$).

Since the single-stage multi-input forward DC-DC chopper type high-frequency link's inverter with series simultaneous power supply of the present disclosure shares a multi-input single-output combined isolated bidirectional forward DC-DC chopper and an output filter circuit, there is an essential difference from the circuit structure of a traditional multi-input inverter composed of the DC-DC converter and the inverter in two-stage cascade. Therefore, the inverter of the present disclosure is novel and creative. Furthermore, the inverter has the following advantages. The high-frequency isolation is performed between the output and the input, the multi-input power source supplies power in a time-sharing or simultaneous manner, the circuit topology is simple, the single-stage power conversion is performed, the buck-boost ratio is large, the input voltage modulation is flexible, the conversion efficiency is high (that means low energy loss), the output voltage waveform is high-quality, the output capacity is medium and large, the cost is low and the application prospects are vast. Hence, the inverter of the present disclosure is an ideal energy-saving and consumption-reducing single-stage multi-input inverter, which is of great value in the present era of an energy-saving and conservation-minded society that we strongly advocate.

Figure 7:
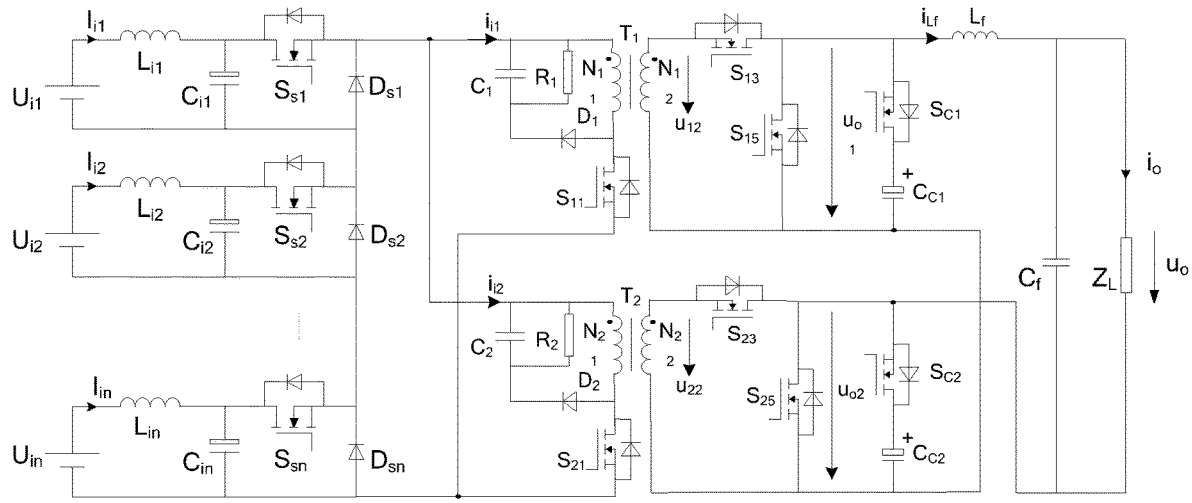
FIG. 7 shows a schematic diagram of a single-transistor forward DC-DC chopper type circuit of topology in embodiment 1 of the single-stage multi-input forward DC-DC chopper type high-frequency link's inverter with series simultaneous power supply circuit.
Figure 8:
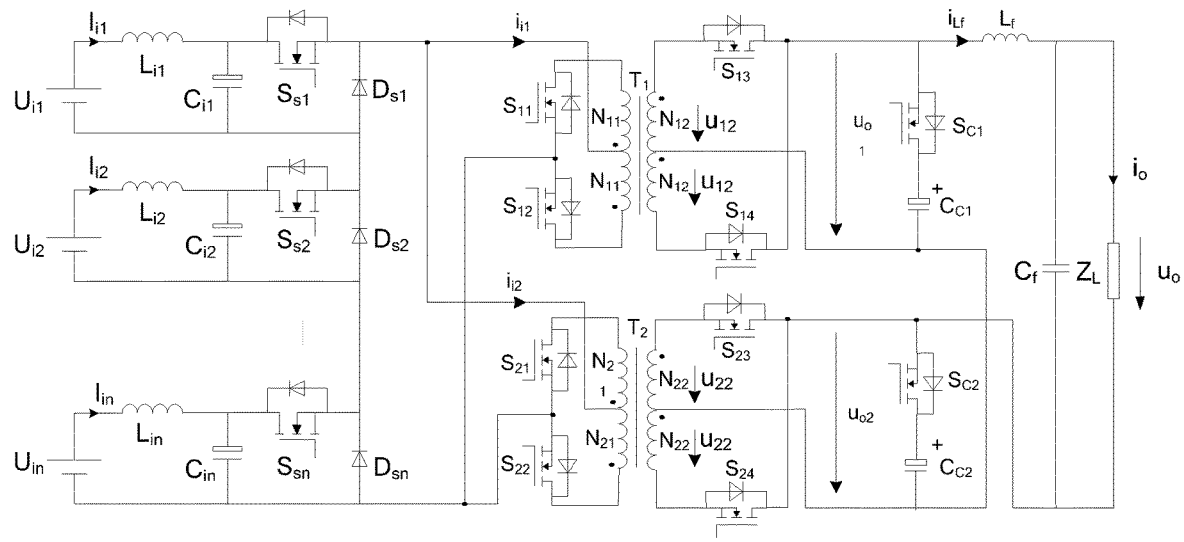
FIG. 8 shows a schematic diagram of a push-pull full-wave DC-DC chopper type circuit of topology in embodiment 2 of the single-stage multi-input forward DC-DC chopper type high-frequency link's inverter with series simultaneous power supply circuit.
Figure 9:
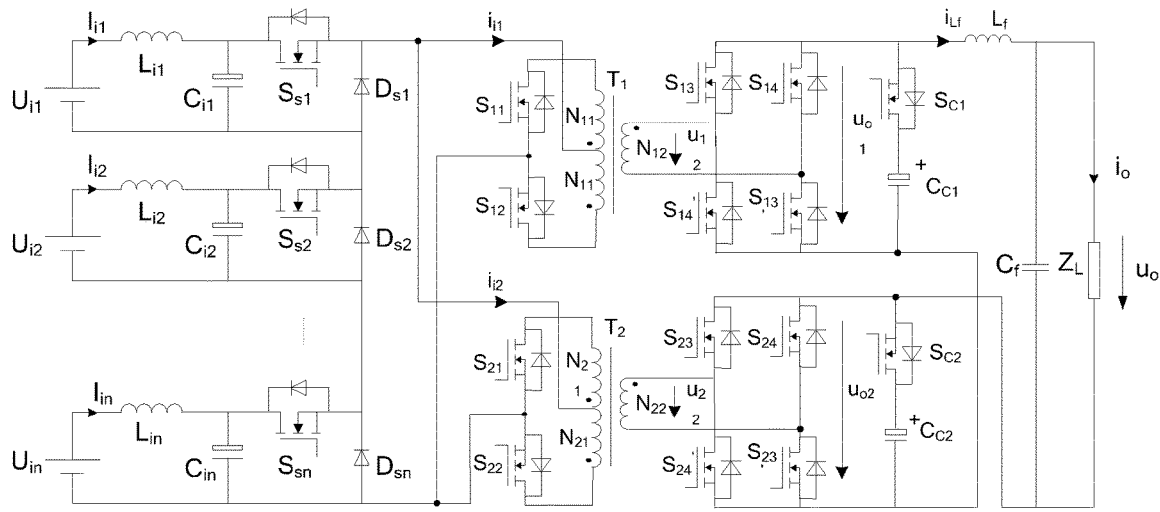
FIG. 9 shows a schematic diagram of a push-pull bridge DC-DC chopper type circuit of topology in embodiment 3 of the single-stage multi-input forward DC-DC chopper type high-frequency link's inverter with series simultaneous power supply circuit.
Figure 10:
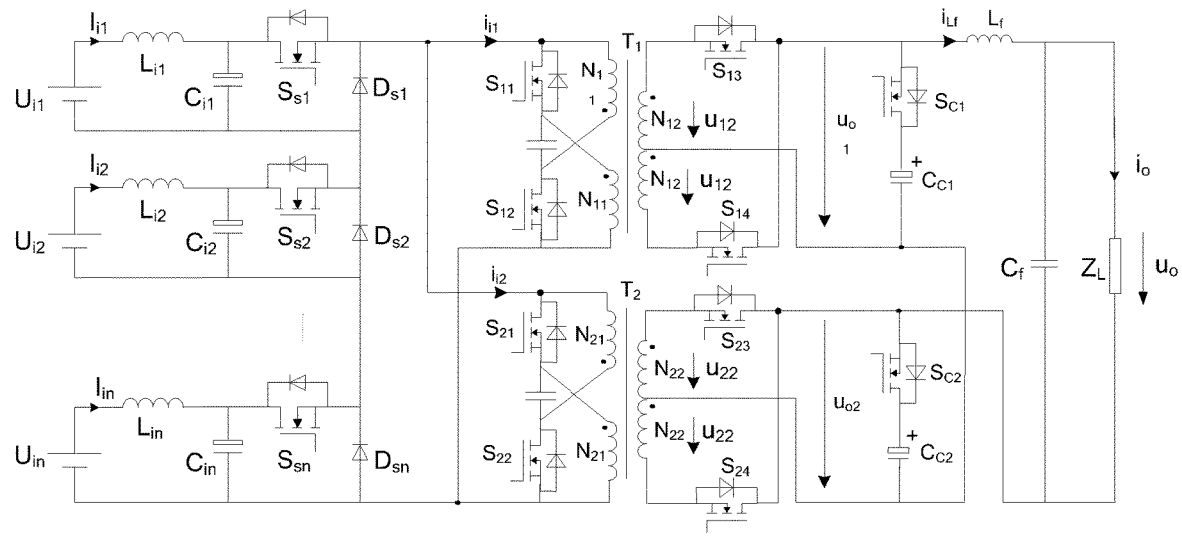
FIG. 10 shows a schematic diagram of a push-pull forward full-wave DC-DC chopper type circuit of topology in embodiment 4 of the single-stage multi-input forward DC-DC chopper type high-frequency link's inverter with series simultaneous power supply circuit.
Figure 11:
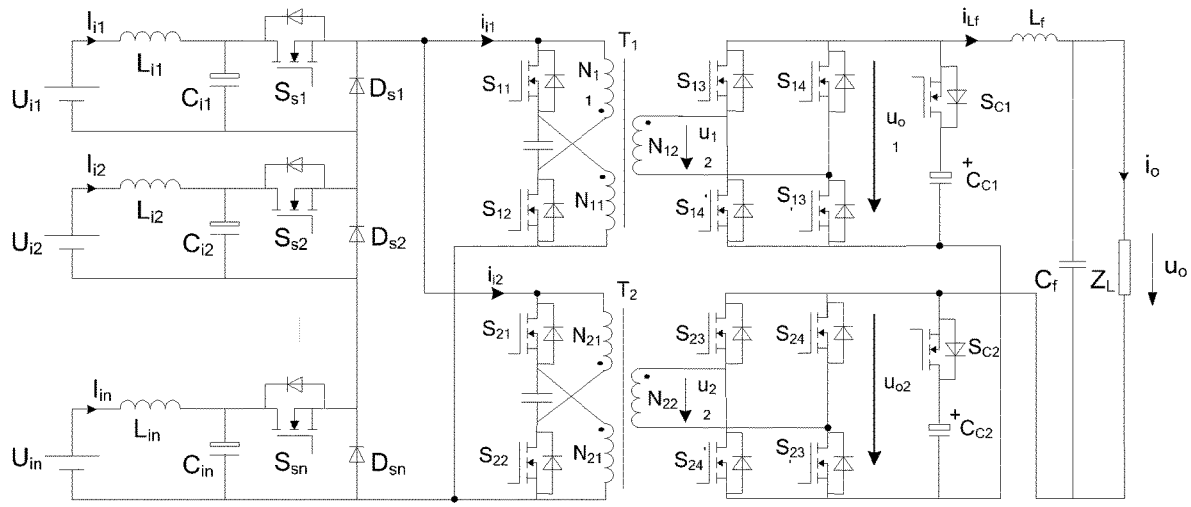
FIG. 11 shows a schematic diagram of a push-pull forward bridge DC-DC chopper type circuit of topology in embodiment 5 of the single-stage multi-input forward DC-DC chopper type high-frequency link's inverter with series simultaneous power supply circuit.
Figure 12:
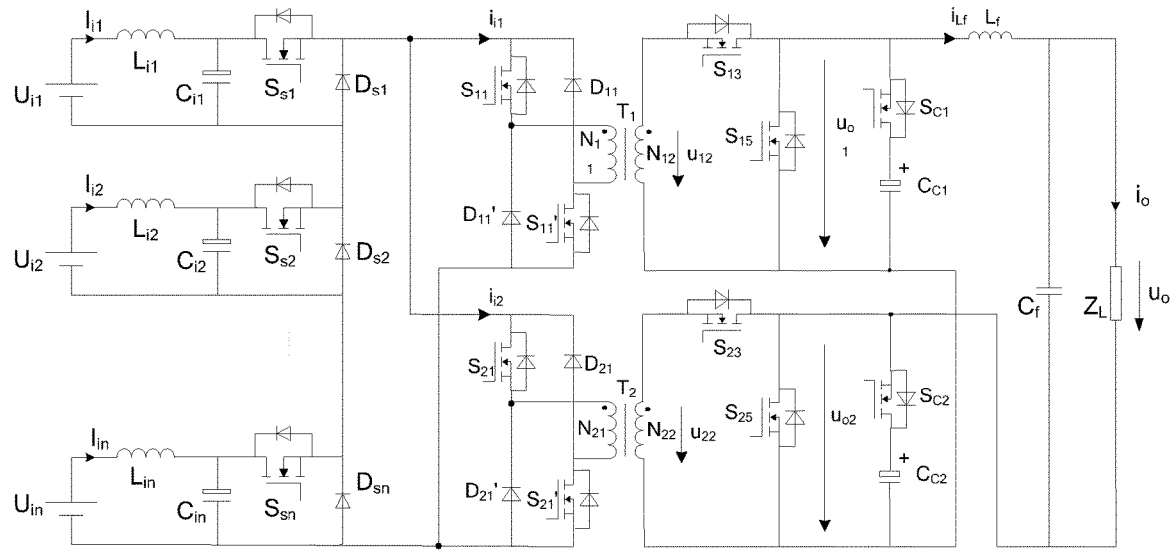
FIG. 12 shows a schematic diagram of a double-transistor forward DC-DC chopper type circuit of topology in embodiment 6 of the single-stage multi-input forward DC-DC chopper type high-frequency link's inverter with series simultaneous power supply circuit.
Figure 13:
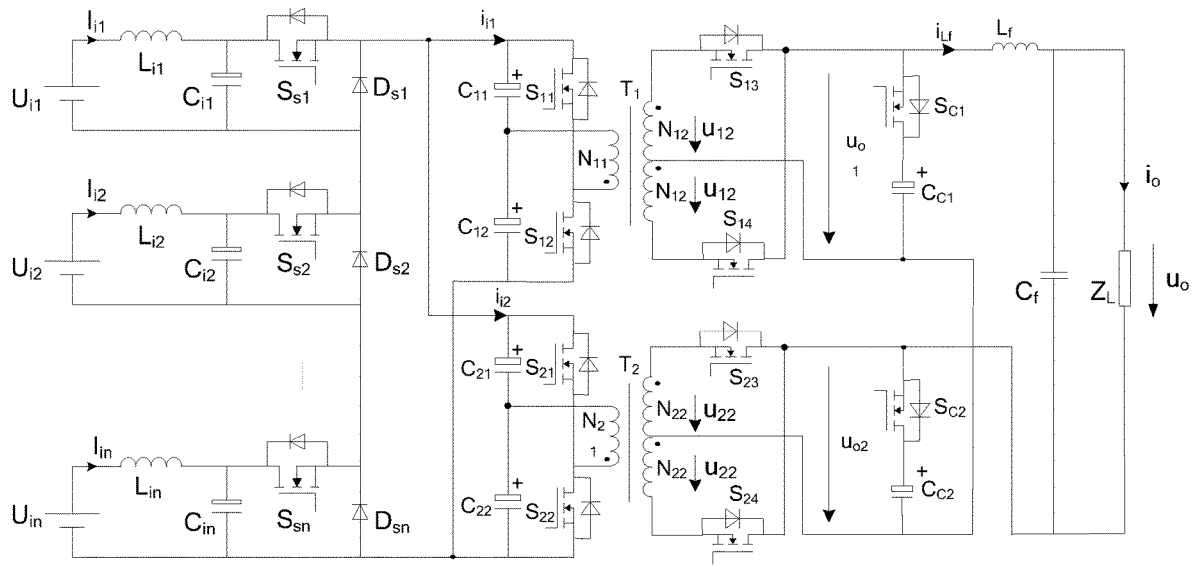
FIG. 13 shows a schematic diagram of a half-bridge full-wave DC-DC chopper type circuit of topology in embodiment 7 of the single-stage multi-input forward DC-DC chopper type high-frequency link's inverter with series simultaneous power supply circuit.
Figure 14:
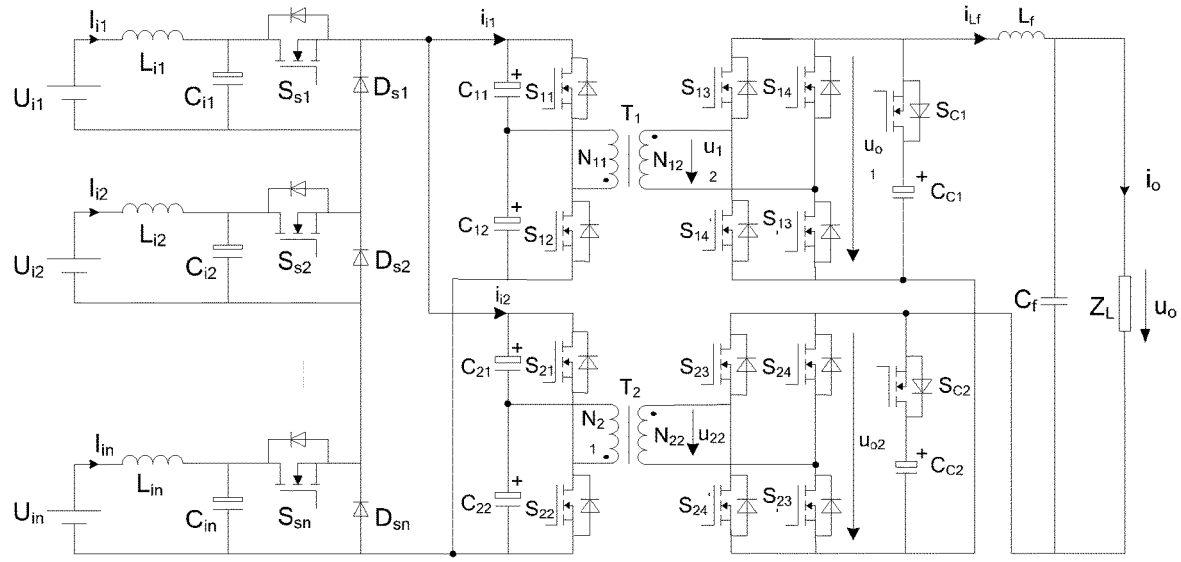
FIG. 14 shows a schematic diagram of a half-bridge DC-DC chopper type circuit of topology in embodiment 8 of the single-stage multi-input forward DC-DC chopper type high-frequency link's inverter with series simultaneous power supply circuit.
Figure 15:
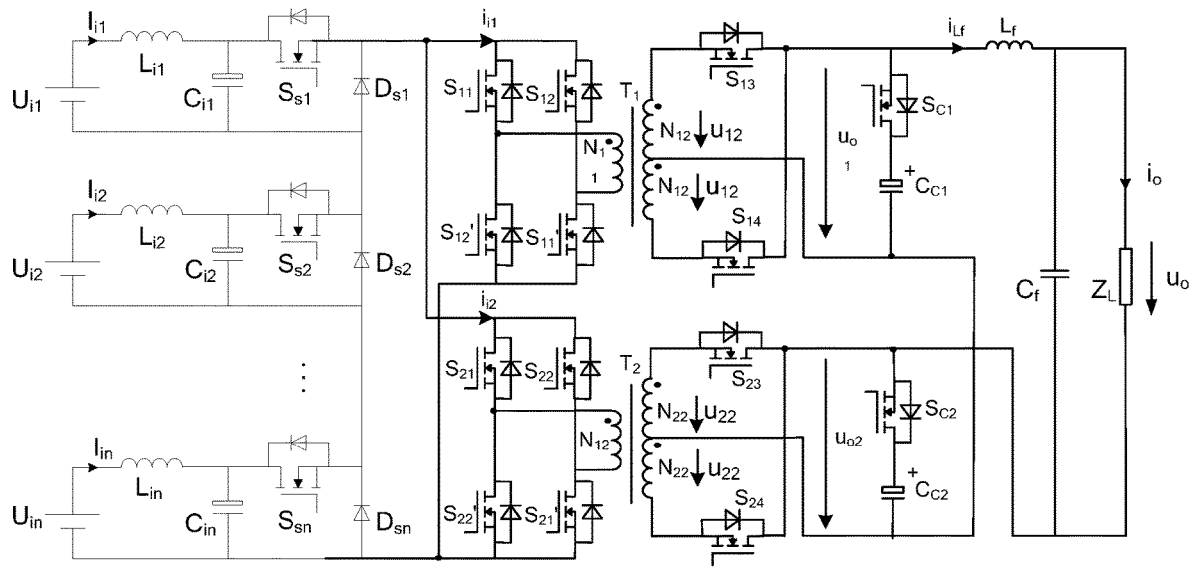
FIG. 15 shows a schematic diagram of a full-bridge full-wave DC-DC chopper type circuit of topology in embodiment 9 of the single-stage multi-input forward DC-DC chopper type high-frequency link's inverter with series simultaneous power supply circuit.
Figure 16:
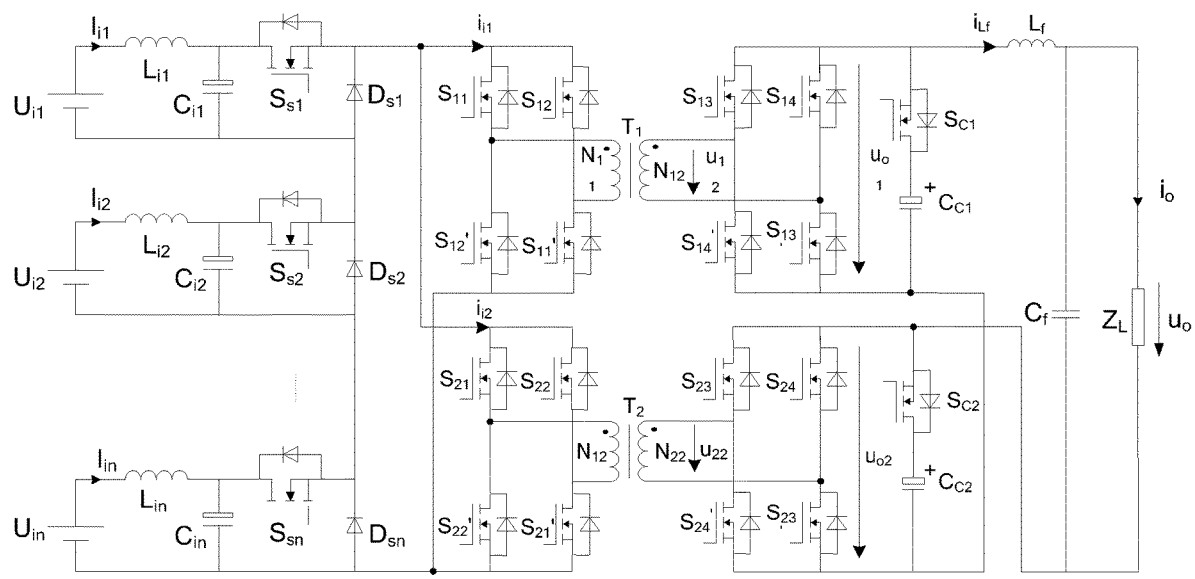
FIG. 16 shows a schematic diagram of a full-bridge DC-DC chopper type circuit of topology in embodiment 10 of the single-stage multi-input forward DC-DC chopper type high-frequency link's inverter with series simultaneous power supply circuit.

The circuit topologic family embodiments of the single-stage multi-input forward DC-DC chopper type high-frequency link's inverter with series simultaneous power supply are shown in FIGS. 7, 8, 9, 10, 11, 12, 13, 14, 15, and 16. In the circuit shown in FIGS. 7-16, the multi-path series simultaneous select power switch circuit whose output ends are connected in inward series is composed of n two-quadrant high-frequency power switches capable of withstanding unidirectional voltage stress and bidirectional current stress and n diodes. The single-input single-output combined isolated bidirectional forward DC-DC chopper is composed of a plurality of two-quadrant high-frequency power switches capable of withstanding unidirectional voltage stress and bidirectional current stress. Two isolated bidirectional forward DC-DC choppers in the single-input single-output combined isolated bidirectional forward DC-DC chopper operate in turn for half a low-frequency output cycle. The active clamp circuit connected in parallel to the output ends of each isolated bidirectional forward DC-DC chopper is used to suppress the voltage spike of the high-frequency rectifier power switch. The active clamp circuit is composed of the clamp switch $S_{c1}$ and the clamp capacitor $C_{c1}$ connected in series or composed of the clamp switch $S_{c2}$ and the clamp capacitor $C_{c2}$ connected in series. $R_1$, $C_1$, $D_1$ and $R_2$, $C_2$ and $D_2$ in FIG. 7 respectively form the clamp circuits of two single-transistor forward DC-DC choppers for realizing the magnetic reset of the high-frequency transformers $T_1$ and $T_2$ and suppresses the voltage spike of the high-frequency power switches. The magnetic reset techniques such as reset windings, LCD clamps, and active clamps can also be used. Specifically, the single-transistor forward DC-DC chopper type circuit shown in FIG. 7 is composed of n+6 two-quadrant high-frequency power switches capable of withstanding unidirectional voltage stress and bidirectional current stress and n diodes. The push-pull full-wave DC-DC chopper type circuit, the push-pull forward full-wave DC-DC chopper type circuit and the half-bridge full-wave DC-DC chopper type circuit shown in FIGS. 8, 10, and 13 are composed of n+8 two-quadrant high-frequency power switches capable of withstanding unidirectional voltage stress and bidirectional current stress and n diodes. The push-pull bridge DC-DC chopper type circuit, the push-pull forward bridge DC-DC chopper type circuit and the half-bridge DC-DC chopper type circuit shown in FIGS. 9, 11, and 14 are composed of n+12 two-quadrant high-frequency power switches capable of withstanding unidirectional voltage stress and bidirectional current stress and n diodes. The double-transistor forward DC-DC chopper type circuit shown in FIG. 12 is composed of n+8 two-quadrant high-frequency power switches capable of withstanding unidirectional voltage stress and bidirectional current stress, and n+4 diodes. The full-bridge full-wave DC-DC chopper type circuit and the full-bridge bridge DC-DC chopper type circuit shown in FIG. 15 and FIG. 16 are respectively composed of n+12, n+16 two-quadrant high-frequency power switches capable of withstanding unidirectional voltage stress and bidirectional current stress and n diodes. Additionally, it is noted that the circuits shown in FIGS. 7-16 show the cases where the input filter is an LC filter, and fail to show the circuits where the input filter is a capacitor filter owing to the limited space. The circuits shown in FIGS. 7-16 only show the circuit diagram of the output LC filter applied for the passive AC load, but do not show the circuit diagram of the output LCL filter applied for the AC grid load. The voltage stress of the power switch in the topology embodiments of the single-stage multi-input forward DC-DC chopper type high-frequency link's inverter with series simultaneous power supply is shown in Table 1. The single-transistor, push-pull, push-pull forward DC-DC chopper type circuits are respectively suitable for the cases required for the medium-and-high power and low-voltage input inversion. The double-transistor, half-bridge, full-bridge forward DC-DC chopper type circuits are respectively suitable for the cases required for the medium-and-high power and high voltage input inversion. The topology family of the circuits is used to invert multiple unstable input DC voltages connected to non-common ground into a desired high-quality output AC power with a stable voltage, which form the novel single-stage multiple new energy distributed power supply systems with excellent performance and broad application prospects. The multi-input sources, such as photovoltaic cell 40-60 VDC/220V50HzAC or 115V400HzAC, proton exchange membrane fuel cell 85-120V/220V50HzAC or 115V400HzAC, small and medium-sized household wind driven generator 24-36-48VDC/220V50HzAC or 115V400HzAC, large-scale wind driven generator 510VDC/220V50HzAC or 115V400HzA supply power to the AC load or the AC grid.

TABLE 2 the voltage stress of the power switch in the topology embodiments of the single-stage multi-input forward DC-DC chopper type high-frequency link's inverter with series simultaneous power supply

| circuit topology | $S_{s1}, S_{s2}, \ldots, S_{sn}$ $D_{s1}, D_{s2}, \ldots, D_{sn}$ | $S_{11}(S'_{11})$, $S_{12}(S'_{12})$, $S_{21}(S'_{21})$, $S_{22}(S'_{22})$ | $D_{11}(D'_{11})$, $D_{21}(D'_{21})$ voltage | power switch $S_{13}(S'_{13}), S_{14}(S'_{14}), S_{23}(S'_{23})$, $S_{24}(S'_{24})$ | $S_{15}, S_{25}$ |
|---|---|---|---|---|---|
| single-transistor push-pull full-wave push-pull bridge push-pull | $U_{i1}, U_{i2}, \ldots, U_{in}$ | $2(U_{i1} + U_{i2} + \ldots + U_{in})$ | / | $(U_{i1} + U_{i2} + \ldots + U_{in})N_2/N_1$ $2(U_{i1} + U_{i2} + \ldots + U_{in})N_2/N_1$ $(U_{i1} + U_{i2} + \ldots + U_{in})N_2/N_1$ $2(U_{i1} + U_{i2} + \ldots + U_{in})N_2/$ | / |

TABLE 2-continued the voltage stress of the power switch in the topology embodiments of the
single-stage multi-input forward DC-DC chopper type high-frequency link's inverter
with series simultaneous power supply

| | power switch | | | | |
|---|---|---|---|---|---|
| circuit topology | $S_{s1}, S_{s2}, \ldots, S_{sn}$ $D_{s1}, D_{s2}, \ldots, D_{sn}$ | $S_{11}(S'_{11})$, $S_{12}(S'_{12})$, $S_{21}(S'_{21})$, $S_{22}(S'_{22})$ | $D_{11}(D'_{11})$, $D_{21}(D'_{21})$ voltage | $S_{13}(S'_{13}), S_{14}(S'_{14}), S_{23}(S'_{23})$, $S_{24}(S'_{24})$ | $S_{15}, S_{25}$ |
| forward full-wave push-pull forward bridge | | | | $N_1$ $(U_{i1} + U_{i2} + \ldots + U_{in})N_2/N_1$ | |
| double-transistor | | $U_{i1} + U_{i2} + \ldots + U_{in}$ | $U_{i1} + U_{i2} + \ldots + U_{in}$ | $(U_{i1} + U_{i2} + \ldots + U_{in})N_2/N_1$ | |
| half-bridge full-wave | | | / | $(U_{i1} + U_{i2} + \ldots + U_{in})N_2/N_1$ | / |
| half-bridge | | | | $(U_{i1} + U_{i2} + \ldots + U_{in})N_2/(2N_1)$ | |
| full-bridge full-wave | | | | $2(U_{i1} + U_{i2} + \ldots + U_{in})N_2/N_1$ | |
| full-bridge | | | | $(U_{i1} + U_{i2} + \ldots + U_{in})N_2/N_1$ | |

The energy management control strategy is critical for the power supply system combined with multiple new energy sources. Due to the multiple input sources and the corresponding power switching units, it is necessary to control multiple duty cycles. Namely, there are multiple control degrees of freedom which make it possible for energy management of multiple new energy sources. The energy management control strategy of the single-stage multi-input forward DC-DC chopper type high-frequency link's inverter with series simultaneous power supply is required to simultaneously have three major functions which are the energy management of the input source, maximum power point tracking (MPPT) of new energy power generation equipment such as photovoltaic cell and wind driven generator, and the output voltage (current) control. In some cases, it is further required for the charge/discharge control of the accumulator and the system having a smooth and seamless switching between different power supply modes. The single-stage multi-input forward DC-DC chopper type high-frequency link's inverter with series simultaneous power supply employs two different energy management modes. The energy management mode I, is a master-slave power distribution mode, wherein the power needed by the load is supplied by the $1^{st}, 2^{nd}, \ldots, (n-1)^{th}$ path input sources of the main power supply equipment as much as possible. When the input currents of the $1^{st}, 2^{nd}, \ldots, (n-1)^{th}$ path input sources are determined, the input power of the $1^{st}, 2^{nd}, \ldots, (n-1)^{th}$ path input sources are determined accordingly. The shortage of power needed by the load is provided by the $n^{th}$ path input source of the power supply device, without the addition of accumulator energy storage equipment. The energy management mode II, is a maximum power output mode, wherein the $1^{st}, 2^{nd}, \ldots, n^{th}$ path input sources output maximum power to the load, eliminating the accumulator energy storage equipment and meeting the requirement for the grid-tied power generation system to make full utilization of energy. The accumulator charge/discharge device is connected to one output end in parallel, which can stabilize the output voltage (current) of the independent power supply system. When the input voltages of the n paths new energy sources are all determined, the input power of the $1^{st}, 2^{nd}, \ldots, n^{th}$ path input sources can be controlled by controlling the input currents of the $1^{st}, 2^{nd}, \ldots, n^{th}$ path input sources.

Figure 17:
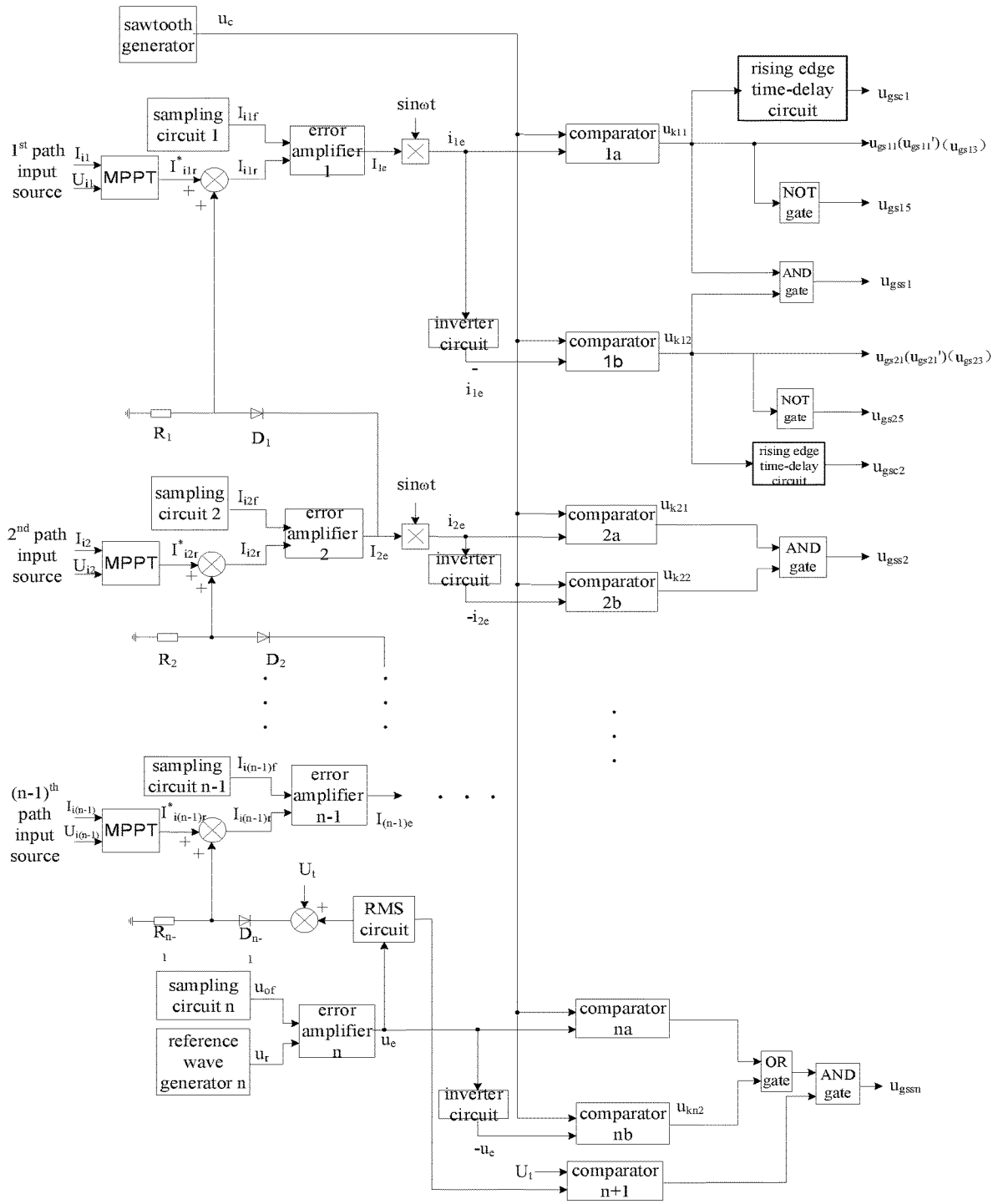
FIG. 17 shows a block diagram of an energy management control of output voltage and an input current instantaneous value SPWM master-slave power distribution of a single-transistor and a double-transistor single-stage multi-input forward DC-DC chopper type high-frequency link's inverter with series simultaneous power supply.
Figure 18:
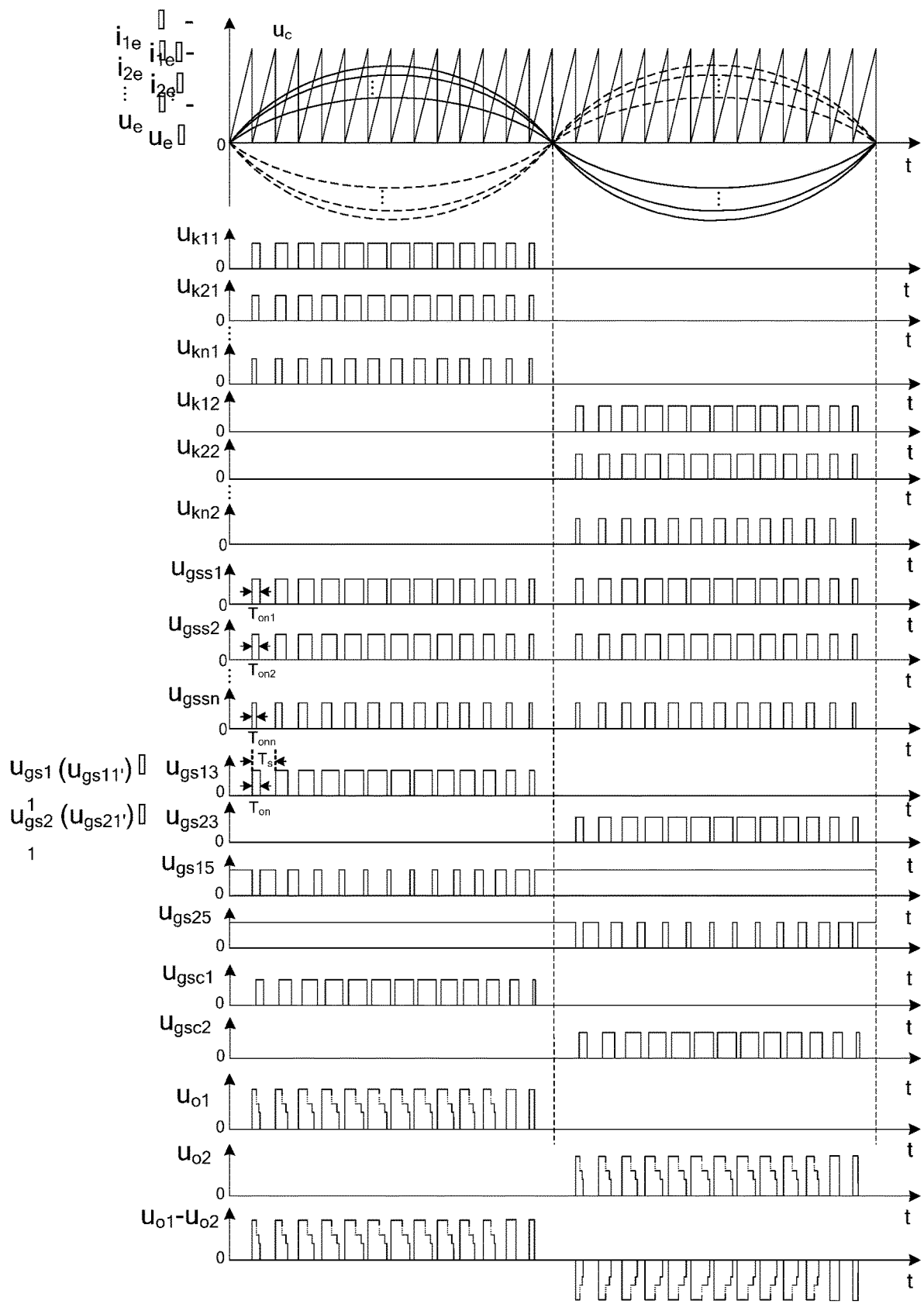
FIG. 18 shows a schematic oscillogram of the energy management control of the output voltage and the input current instantaneous value SPWM master-slave power distribution of the single-transistor and the double-transistor single-stage multi-input forward DC-DC chopper type high-frequency link's inverter with series simultaneous power supply.
Figure 19:
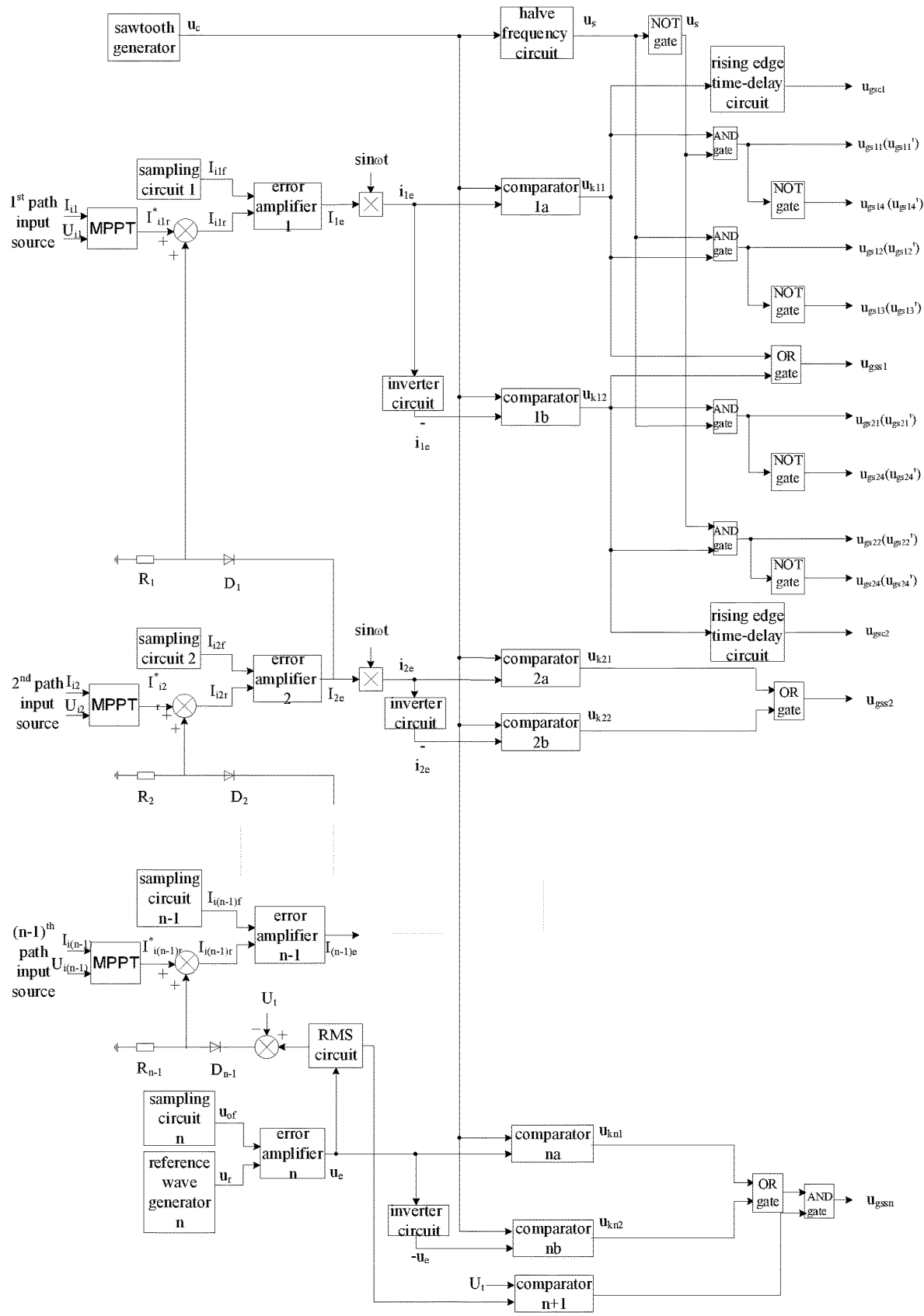
FIG. 19 shows a block diagram of the energy management control of the output voltage and the input current instantaneous value SPWM master-slave power distribution of the push-pull, push-pull forward, half-bridge, full-bridge single-stage multi-input forward DC-DC chopper type high-frequency link's inverter with series simultaneous power supply.
Figure 20:
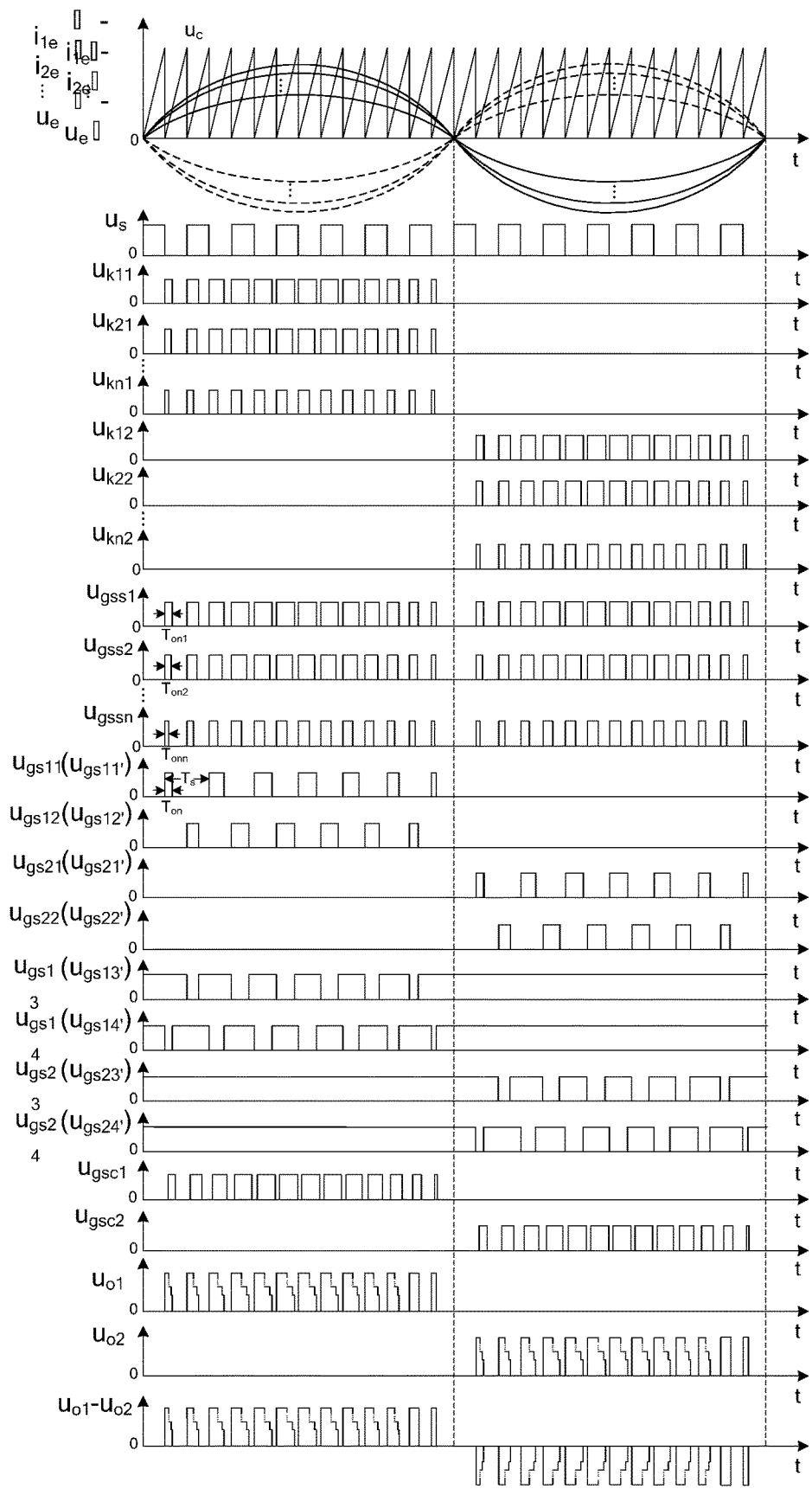
FIG. 20 shows a schematic oscillogram of the energy management control of the output voltage and the input current instantaneous value SPWM master-slave power distribution of the push-pull, push-pull forward, half-bridge, full-bridge single-stage multi-input forward DC-DC chopper type high-frequency link's inverter with series simultaneous power supply.

The single-stage multi-input forward DC-DC chopper type high-frequency link's inverter with series simultaneous power supply employs the energy management control strategy of the output voltage, input current instantaneous value SPWM master-slave power distribution to form an independent power supply system or employs the energy management control strategy of the input current instantaneous value SPWM maximum power output to form a grid-connected power supply system. The energy management control block diagram and the control schematic oscillogram of output voltage, input current instantaneous value SPWM master-slave power distribution in a case where the output power of the $1^{st}, 2^{nd}, \ldots, (n-1)^{th}$ path input sources is fixed and the $n^{th}$ path input source supplies the insufficient power needed by the load are shown respectively in FIGS. 17, 18, 19, and 20. FIGS. 17 and 18 show the control schemes for the single-transistor and double-transistor forward DC-DC chopper type circuit topology. FIGS. 19 and 20 show the control schemes of the push-pull, push-pull forward, half-bridge, full-bridge forward DC-DC chopper type circuit topology. The two control schemes are very similar in nature. The basic idea of the control scheme is that the high-frequency inverter switch in the n-input single-output combined isolated bidirectional forward DC-DC chopper modulates the n input DC voltage sources $U_{i1}, U_{i2}, \ldots, U_{in}$ into the bipolar three-state multi-level SPWM voltage wave, wherein the turn-on time of the $1^{st}, 2^{nd}, \ldots, (n-1)^{th}$ path select power switches is obtained by crossing the sawtooth wave according to the product of the magnitude of the error current and the reference sinusoidal synchronization signal (realizing the maximum power output of the $1^{st}, 2^{nd}, \ldots, (n-1)^{th}$ path input sources), and the turn-on time of the $n^{th}$ path select power switch is obtained by crossing the sawtooth wave with the magnitude of the error voltage (to achieve the supplying of the $n^{th}$ path input source power). The turn-on time of the $1^{st}$ path power switch is the turn-on time of the inverter switch. The bipolar three-state multi-level SPWM voltage wave is isolated by the high-frequency transformer $T_1, T_2$ and rectified by the high-frequency rectifier into unipolar three-state multi-level SPWM voltage wave $u_{o1}$, $u_{o2}$, and then is filtered to obtain the high-quality sinusoidal AC voltage $u_o$ or sinusoidal AC $i_o$. The output voltage of the inverter is stabilized by adjusting the output voltage error signal, and this control strategy is suitable for the circuit shown in FIGS. 7-16. The $1^{st}$, $2^{nd}$, ..., $(n-1)^{th}$ path input sources are calculated by the maximum power point to obtain the reference current signals $I^*_{i1r}$, $I^*_{i2r}$, ..., $I^*_{i(n-1)r}$. The input current feedback signals $I_{i1f}$, $I_{i2f}$, ..., $I_{i(n-1)f}$ of the $1^{st}$, $2^{nd}$, ..., $(n-1)^{th}$ path of the inverter and the reference current signals $I_{i1r}$, $I_{i2r}$, ..., $I_{i(n-1)r}$ of the $1^{st}$, $2^{nd}$, ..., $(n-1)^{th}$ path are respectively compared and amplified by the proportional integral regulator. The amplified error signals $I_{1e}$, $I_{2e}$, ..., $I_{(n-1)e}$ are respectively multiplied by the reference sinusoidal synchronization signal to obtain $i_{1e}$, $i_{2e}$, ..., $i_{(n-1)e}$ and inverted signals $-i_{1e}$, $-i_{2e}$, ..., $-i_{(n-1)e}$. The output voltage feedback signal $u_{of}$ of the inverter and the reference sinusoidal voltage $u_r$ are compared and amplified by the proportional integral regulator to obtain voltage error amplification signal $u_e$. The $i_{1e}$, $i_{2e}$, ..., $i_{(n-1)e}$, $u_e$, $-i_{1e}$, $-i_{2e}$, ..., $-i_{(n-1)e}$ and $-u_e$ are respectively compared with the unipolar sawtooth carrier wave $u_c$, and pass through the appropriate combinational logic circuits to obtain the power switch control signals $u_{gss1}$, $u_{gss2}$, ..., $u_{gssn}$, $u_{gs11}$ ($u_{gs'11}$), $u_{gs13}$, $u_{gs21}$ ($u_{gs'21}$), $u_{gs23}$, $u_{gs15}$, $u_{gs25}$, $u_{gsc1}$, $U_{gsc2}$ of the single-transistor and double-transistor circuit topologies shown in FIGS. 7 and 12, or to obtain the power switch control signals $u_{gss1}$, $u_{gss2}$, ..., $u_{gssn}$, $u_{gs11}$ ($u_{gs'11}$), $u_{gs12}$ ($u_{gs'12}$), $u_{gs13}$ ($u_{gs'13}$), $u_{gs14}$ ($u_{gs'14}$), $u_{gs21}$ ($u_{gs'21}$), $u_{gs22}$ ($u_{gs'22}$), $u_{gs23}$ ($u_{gs'23}$), $u_{gs24}$ ($u_{gs'24}$), $u_{gsc1}$, $u_{gsc2}$ of the push-pull, push-pull forward, half-bridge, full-bridge circuit topologies shown in FIGS. 8, 9, 10, 11, 13, 14, 15, and 16. When the load power $P_o$ is greater than the sum of the maximum powers of the $1^{st}$, $2^{nd}$, ..., $(n-1)^{th}$ path input sources, the output voltage $u_o$ decreases. When the effective value of the output voltage $u_e$ of the voltage regulator is greater than the threshold comparison level $U_t$ and the $I_{1e}$, $I_{2e}$, ..., $I_{(n-1)e}$ are all greater than zero, the diodes $D_1$, $D_2$, ..., $D_{n-1}$ block the current. The $1^{st}$, $2^{nd}$, ..., $(n-1)^{th}$ path current regulators and the $n^{th}$ path voltage regulator respectively operate independently, i.e $I_{i1r}=I^*_{i1r}$, $I_{i2r}=I^*_{i2r}$, ..., $I_{i(n-1)r}=I^*_{i(n-1)r}$. The $1^{st}$, $2^{nd}$, ..., $(n-1)^{th}$ path current regulators are used to achieve the maximum power output of the $1^{st}$, $2^{nd}$, ..., $(n-1)^{th}$ path input sources. The $n^{th}$ voltage regulator is used to stabilize the output voltage of the inverter and the n paths input sources supply power to the load in a time-sharing or simultaneous manner. When the load power $P_o$ is less than the sum of the maximum powers of the $1^{st}$, $2^{nd}$, ..., $(n-1)^{th}$ path input sources, the output voltage $u_o$ increases. When the effective value of the output voltage $u_e$ of the voltage regulator falls below the threshold comparison level $U_t$, the diode $D_{n-1}$ conducts the current and $D_1$, $D_2$, ..., $D_{n-2}$ still block the current. The hysteresis loop comparison circuit n+1 outputs at a low level. The $n^{th}$ path input source stops the power supply. The voltage regulator and the current regulator form a double closed loop control system. The $1^{st}$, $2^{nd}$, ..., $(n-1)^{th}$ path input sources supply power to the load in a time-sharing or simultaneous manner in one switching cycle. The reference current $I_{i(n-1)r}$ of current regulator is reduced, i. e. $I_{i(n-1)r} < I^*_{i(n-1)r}$. The output power of the $(n-1)^{th}$ path input source is reduced (working at the non-maximum operating point), the output power of the $n^{th}$ input source is reduced to zero and the output voltage $u_o$ of the inverter tends to be stable. When the input voltage or the load changes, the error voltage signal $u_e$ and the error current signals $i_{1e}$, $i_{2e}$, ..., $i_{(n-1)e}$ are changed by adjusting the reference voltage $u_r$ or the feedback voltage $u_{of}$, thereby changing the duty cycles $d_1$, $d_2$, ..., $d_n$ of the n paths series simultaneous select switches. Consequently, the output voltage and input current (output power) of the inverter can be adjusted and stabilized.

When the $n^{th}$ path input source in FIGS. 17-20 is designed as the input current feedback to control the input current, then the energy management control strategy of the input current instantaneous value SPWM maximum power output is formed. The $1^{st}$, $2^{nd}$, ..., $n^{th}$ path current regulators operate independently, are used to achieve the maximum power output of the respective input sources and the n paths input sources supply power to the load in a simultaneous or time-sharing manner.

The control schematic oscillograms shown in FIGS. 18 and 20 indicate the high-frequency switching period Ts, the turn-on time $T_{on1}$, $T_{on2}$, ..., $T_{onn}$ of the $1^{st}$, $2^{th}$, ..., $n^{th}$ path input sources in a certain high-frequency switching period Ts and the turn-on time of the inverter switch $T_{on}=T_{on1}$. The turn-on time of the inverter switch is sinusoidally varied during an output voltage cycle.

Figure 21:
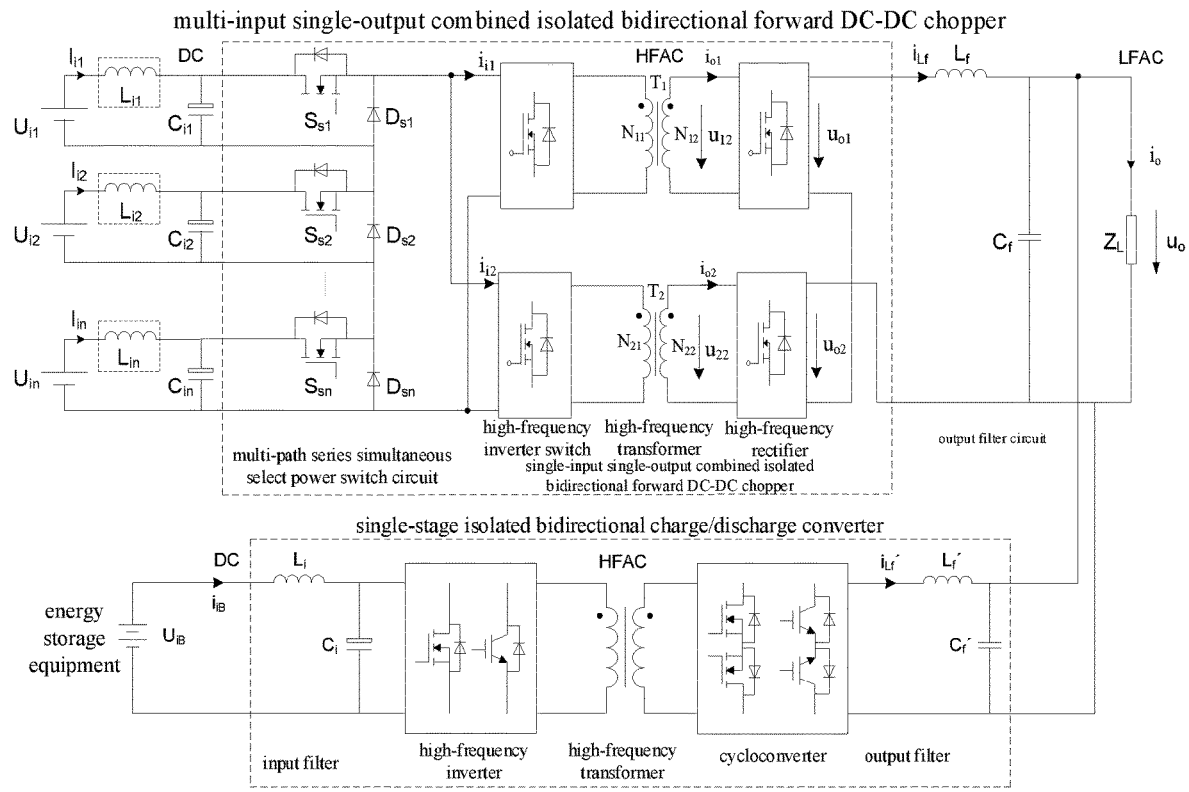
FIG. 21 shows a single-stage multi-input forward DC-DC chopper type high-frequency link's independent power supply system with series simultaneous power supply whose output end is connected in parallel to a single-stage isolated bidirectional charge/discharge converter.

In order to constitute an independent power supply system capable of fully utilizing the energy of multiple input sources, the plurality of input sources should operate in the maximum power output mode and need to be configured with energy storage equipment to keep the output voltage stable. Namely, a single-stage isolated bidirectional charge/discharge converter is connected to the output end of the inverter as shown in FIG. 21. The single-stage isolated bidirectional charge/discharge converter is composed of the input filter ($L_i$, $C_i$ or $C_i$), the high-frequency inverter, the high-frequency transformer, the cycloconverter, and the output filter ($L'_f$, $C'_f$) which are successively connected in cascade. The cycloconverter is composed of the four-quadrant high-frequency power switch capable of withstanding the bidirectional voltage stress and bidirectional current stress. When transferring energy forward (discharging of energy storage equipment), and transferring energy reversely (charging of energy storage equipment), the single-stage isolated bidirectional charge/discharge converter is equivalent to a single-stage high-frequency link's DC-AC converter and a single-stage high-frequency link's AC-DC converter, respectively.

Figure 22:
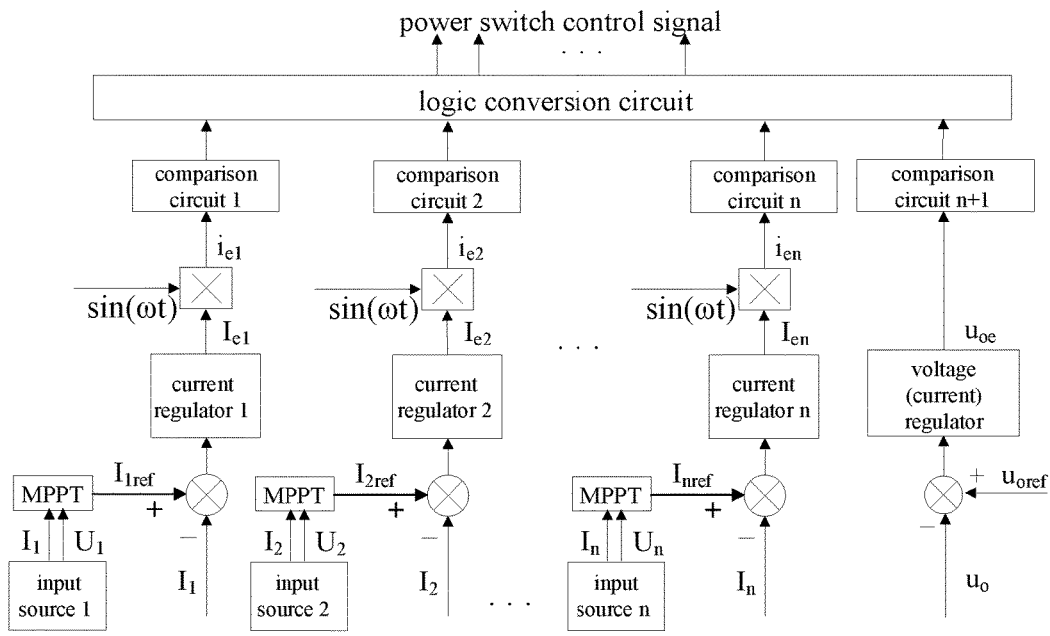
FIG. 22 shows an energy management control strategy of a maximum power output of an output voltage independent control loop with the single-stage isolated bidirectional charge/discharge converter.
Figure 23:
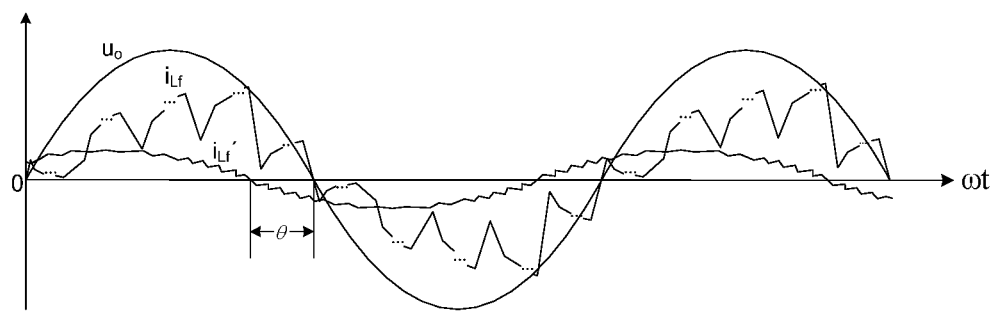
FIG. 23 shows an oscillogram of output voltage $u_o$ and output filter inductor currents $i_{Lf}$ and $i_{Lf}'$ of the independent power supply system.

The independent power supply system employs the maximum power output energy management control strategy of an output voltage independent control loop with a single-stage isolated bidirectional charge/discharge converter as shown in FIG. 22. When the load power $P_o=U_o I_o$ is greater than the sum of the maximum powers $P_{1max}+P_{2max}+...+P_{nmax}$ of the plurality of input sources, the energy storage equipment such as accumulators and supercapacitors, provides the insufficient power to the load through the single-stage isolated bidirectional charge/discharge converter, i. e. the power supply in mode II; or the energy storage equipment individually supplies power to the load, i.e. the power supply in mode III, which is an extreme case of the power supply in mode II; when the load power $P_o=U_o I_o$ is less than the sum of the maximum powers $P_{1max}+P_{2max}+...+P_{nmax}$ of the plurality of input sources, the rest of the output energy of the plurality of input sources is supplied to charge the energy storage equipment through the single-stage isolated bidirectional charge/discharge converter, i. e. the power supply in mode I. Taking the resistive load as an example, the power flow direction control of the single-stage isolated bidirectional charge/discharge converter will be illustrated hereinafter as shown in FIG. 23. As for the output filter capacitors $C_f$, $C'_f$ and the load $Z_L$, a parallel connection of the output end of the single-stage multi-input forward DC-DC chopper type high-frequency link's inverter with series simultaneous power supply and the output ends of the single-stage isolated bidirectional charge/discharge converter is equivalent to the parallel superposition of the two current sources. As the energy management control strategy shown in FIG. 22, the output filter inductor current $i_{Lf}$ and the output voltage $u_o$ of the single-stage multi-input forward DC-DC chopper type high-frequency link's inverter with series simultaneous power supply have the same frequency and the same phase and output the active power. The charge/discharge converter is controlled by the SPWM signal formed by crossing the high-frequency carrier wave with the error amplification signal $u_{oe}$ of the output voltage $u_o$ and the reference voltage $u_{oref}$. There is a phase difference θ between the output filter inductor current $i_{Lf}'$ and $u_o$. Different phase differences θ are indicative of outputting active power of different magnitudes and directions. When $P_o = P_{1max} + P_{2max} + \ldots + P_{nmax}$, θ=90°, the active power output by the charge/discharge converter is zero, in the no-load state. When $P_o > P_{1max} + P_{2max} + \ldots + P_{nmax}$, $u_o$ decreases, θ<90°, the charge/discharge converter outputs the active power and the energy storage equipment supplies power to the load. Namely, the energy storage equipment supplies the insufficient power needed by the load. When $P_o < P_{1max} + P_{2max} + \ldots + P_{nmax}$, $u_o$ increases, θ>90°, the charge/discharge converter outputs the minus active power and the load feeds back energy to the energy storage equipment. Namely, the rest of the power output by the plurality of input sources is used to charge the energy storage equipment. When θ=180°, the load returns the maximum energy to the energy storage equipment. Therefore, the energy management control strategy can control the magnitude and direction of the power flow of the single-stage isolated bidirectional charge/discharge converter in real time according to the relative magnitudes of $P_o$ and $P_{1max} + P_{2max} + \ldots + P_{nmax}$, and realizes that the system can smoothly and seamlessly switch between three different power supply modes.

What is claimed is:

1. A single-stage multi-input forward DC-DC chopper type high-frequency link's inverter with series simultaneous power supply, comprising: a plurality of input filters connected to a non-common ground; and a common output filter circuit connected to the plurality of input filters by a multi-input single-output combined isolated bidirectional forward DC-DC chopper; each input end of the multi-input single-output combined isolated bidirectional forward DC-DC chopper is connected to an output end of each input filter in a one-to-one correspondence; an output end of the multi-input single-output combined isolated bidirectional forward DC-DC chopper is connected to the output filter circuit; the multi-input single-output combined isolated bidirectional forward DC-DC chopper comprises a multi-path series simultaneous select power switch circuit, wherein output ends of the multi-path series simultaneous select power switch circuit are connected in inward series, and a single-input single-output combined isolated bidirectional forward DC-DC chopper, wherein the multi-path series simultaneous select power switch circuit and the single-input single-output combined isolated bidirectional forward DC-DC chopper are successively connected in cascade; each path of the series simultaneous select power switch circuit of the multi-path series simultaneous select power switch circuit comprises a two-quadrant power switch configured to withstand a unidirectional voltage stress and a bidirectional current stress and a power diode, and a source electrode of the two-quadrant power switch is connected to a cathode of the power diode; a drain electrode of the two-quadrant power switch and an anode of the power diode are respectively a positive input end and a negative input end of the series simultaneous select power switch circuit; the source electrode of the two-quadrant power switch and the anode of the power diode are respectively a positive output end and a negative output end of the series simultaneous select power switch circuit; the single-input single-output combined isolated bidirectional forward DC-DC chopper comprises two identical isolated bidirectional forward DC-DC choppers for outputting respectively a low-frequency positive half cycle unipolar pulse width modulated voltage wave and a low-frequency negative half cycle unipolar pulse width modulated voltage wave, wherein input ends of the two identical isolated bidirectional forward DC-DC choppers are connected in parallel and output ends of the two isolated bidirectional forward DC-DC choppers are connected in series-opposing connection; two non-series output ends of the two isolated bidirectional forward DC-DC choppers are the output end of the multi-input single-output combined isolated bidirectional forward DC-DC chopper; each the isolated bidirectional forward DC-DC chopper of the two isolated bidirectional forward DC-DC choppers comprises a two-quadrant high-frequency inverter switch, a high-frequency transformer, and a high-frequency rectifier formed by a two-quadrant high-frequency power switch for rectification, freewheeling and polarity selection successively connected in cascade; output ends of each of the two isolated bidirectional forward DC-DC choppers are connected in parallel to an active clamp circuit to suppress a voltage spike of a high-frequency rectifier power switch, wherein the active clamp circuit is composed of a clamp switch and a clamp capacitor; the output filter circuit comprises a filter inductor and a filter capacitor successively connected in cascade, or comprises a filter inductor, a filter capacitor, and a filter inductor successively connected in cascade; the two identical isolated bidirectional forward DC-DC choppers operate in turn for half a low-frequency cycle in a low-frequency output voltage cycle, a first isolated bidirectional forward DC-DC chopper of the two identical isolated bidirectional forward DC-DC choppers operates to output a low-frequency half cycle, a second isolated bidirectional forward DC-DC chopper of the two identical isolated bidirectional forward DC-DC choppers stops working, and the two-quadrant power switch for a polarity selection is turned on; a high-frequency inverter switch in the multi-input single-output combined isolated bidirectional forward DC-DC chopper of the single-stage multi-input forward DC-DC chopper type high-frequency link's inverter modulates multi-path input DC voltage sources $U_{i1}$, $U_{i2}$, ..., $U_{in}$ into bipolar three-state multi-level SPWM voltage waves; the bipolar three-state multi-level SPWM voltage waves are isolated by the high-frequency transformer and are rectified by the high-frequency rectifier into unipolar three-state multi-level SPWM voltage waves, to obtain a high-quality sinusoidal AC voltage or a sinusoidal AC on a single-phase AC passive load or a single-phase AC grid after being filtered by an output LC filter; when an energy is transferring forward, an amplitude of the bipolar three-state multi-level SPWM voltage waves is $\pm(U_{i1} + U_{i2} + \ldots + U_{in})N_2/N_1$, $\pm(U_{i1} + U_{i2} + \ldots + U_{in-1})N_2/N_1$, ..., $\pm U_{i1}N_2/N_1$, an amplitude of the unipolar three-state multi-level SPWM voltage waves is $(U_{i1} + U_{i2} + \ldots + U_{in})N_2/N_1$, $(U_{i1} + U_{i2} + \ldots + U_{in-1})N_2/N_1$, ..., $U_{i1}N_2/N_1$, wherein n represents a path number of a plurality of input sources, $N_1$ and $N_2$ represent turns of a primary winding of the high-frequency transformer and turns of a secondary winding of the high-frequency transformer, respectively; n is a natural number greater than 1; a relationship between an output voltage $u_o$ and the multi-path input DC voltage sources, a turns ratio $N_2/N_1$ of the high-frequency transformer, and duty cycles $d_1, d_2, \ldots, d_n$ of multi-path series simultaneous select power switches $S_{s1}, S_{s2}, \ldots, S_{sn}$ is $u_o=(d_1 U_{i1}+d_2 U_{i2}+ \ldots +d_n U_{in}) N_2/N_1$; a circuit topology of the single-stage multi-input forward DC-DC chopper type high-frequency link's inverter with series simultaneous power supply comprises a single-transistor forward DC-DC chopper type circuit, a push-pull full-wave DC-DC chopper type circuit, a push-pull bridge DC-DC chopper type circuit, a push-pull forward full-wave DC-DC chopper type circuit, a push-pull forward bridge DC-DC chopper type circuit, a double-transistor forward DC-DC chopper type circuit, a half-bridge full-wave DC-DC chopper type circuit, a half-bridge DC-DC chopper type circuit, a full-bridge full-wave DC-DC chopper type circuit, and a full-bridge DC-DC chopper type circuit the double-transistor forward DC-DC chopper type circuit is composed of n+8 two-quadrant high-frequency power switches configured to withstand the unidirectional voltage stress and the bidirectional current stress, and n+4 diodes; the single-transistor forward DC-DC chopper type circuit is composed of n+6 two-quadrant high-frequency power switches configured to withstand the unidirectional voltage stress and the bidirectional current stress and n diodes; the push-pull full-wave DC-DC chopper type circuit is composed of n+8 two-quadrant high-frequency power switches configured to withstand the unidirectional voltage stress and the bidirectional current stress and n diodes; the push-pull bridge DC-DC chopper type circuit is composed of n+12 two-quadrant high-frequency power switches configured to withstand the unidirectional voltage stress and the bidirectional current stress and n diodes; the push-pull forward full-wave DC-DC chopper type circuit is composed of n+8 two-quadrant high-frequency power switches configured to withstand the unidirectional voltage stress and the bidirectional current stress and n diodes; the push-pull forward bridge DC-DC chopper type circuit is composed of n+12 two-quadrant high-frequency power switches configured to withstand the unidirectional voltage stress and the bidirectional current stress and n diodes; the half-bridge full-wave DC-DC chopper type circuit is composed of n+8 two-quadrant high-frequency power switches configured to withstand the unidirectional voltage stress and the bidirectional current stress and n diodes; the half-bridge DC-DC chopper type circuit is composed of n+12 two-quadrant high-frequency power switches configured to withstand the unidirectional voltage stress and the bidirectional current stress and n diodes; the full-bridge full-wave DC-DC chopper type circuit is composed of n+12 two-quadrant high-frequency power switches configured to withstand the unidirectional voltage stress and the bidirectional current stress and n diodes; and the full-bridge DC-DC chopper type circuit is composed of n+16 two-quadrant high-frequency power switches configured to withstand the unidirectional voltage stress and the bidirectional current stress and n diodes; an independent power supply system formed by the single-stage multi-input forward DC-DC chopper type high-frequency link's inverter with series simultaneous power supply employs an energy management control strategy of the output voltage and input current instantaneous value SPWM master-slave power distribution, wherein an output power of the $1^{st}, 2^{nd}, \ldots, (n-1)^{th}$ path input sources is fixed and the $n^{th}$ path input source supplies insufficient power needed by a load; a grid-connected power supply system formed by the single-stage multi-input forward DC-DC chopper type high-frequency link's inverter with series simultaneous power supply employs an energy management control strategy of an input current instantaneous value SPWM maximum power output of the $1^{st}, 2^{nd}, \ldots, n^{th}$ path input sources; the single-stage multi-input forward DC-DC chopper type high-frequency link's inverter with series simultaneous power supply inverts a plurality of unstable input DC voltages connected to the non-common ground into a stable and high-quality output AC needed by the load, the plurality of input sources all supply power to an output AC load in a high-frequency switching period, and the plurality of input sources are connected in series to simultaneously supply power to the output AC load in the high-frequency switching period.

2. The single-stage multi-input forward DC-DC chopper type high-frequency link's inverter with series simultaneous power supply according to claim 1, wherein an output end of the single-stage multi-input forward DC-DC chopper type high-frequency link's inverter with series simultaneous power supply is connected in parallel to a single-stage isolated bidirectional charge/discharge converter of an energy storage equipment to form an independent power supply system with a stable output voltage, wherein the independent power supply system with the stable output voltage is configured to make full use of the energy of the plurality of input sources; the single-stage isolated bidirectional charge/discharge converter comprises an input filter, a high-frequency inverter, a high-frequency transformer, a cycloconverter, and an output filter successively connected in cascade; the cycloconverter comprises a four-quadrant high-frequency power switch configured to withstand a bidirectional voltage stress and the bidirectional current stress; the independent power supply system employs a maximum power output energy management control strategy of an output voltage independent control loop with the single-stage isolated bidirectional charge/discharge converter; the plurality of input sources are all operated in a maximum power output mode, and a magnitude and a direction of a power flow of the single-stage isolated bidirectional charge/discharge converter are controlled in real time according to a relative magnitude of a load power and a sum of maximum powers of the plurality of input sources to stabilize a system output voltage, and smoothly and seamlessly switch charging and discharging of the energy storage equipment when the load power is greater than the sum of the maximum powers of the plurality of input sources, the independent power supply system is operating in a first power supply mode, wherein the energy storage equipment provides the insufficient power to the load through the single-stage isolated bidirectional charge/discharge converter; a second power supply mode is an extreme case of the first power supply mode; when the load power is less than the sum of the maximum powers of the plurality of input sources, the independent power supply system is operating in a third power supply mode, wherein the rest of an output energy of the plurality of input sources is supplied to charge the energy storage equipment through the single-stage isolated bidirectional charge/discharge converter; an output filter inductor current and the output voltage of the single-stage multi-input forward DC-DC chopper type high-frequency link's inverter with series simultaneous power supply have the same frequency and the same phase and output an active power; the single-stage isolated bidirectional charge/discharge converter is controlled by a SPWM signal formed by crossing a high-frequency carrier wave with an error amplification signal of the output voltage and a reference voltage; there is a phase difference θ between the output filter inductor current and the output voltage; different phase differences θ are indicative of outputting the active power of different magnitudes and directions; when the load power is equal to the sum of the maximum powers of the plurality of input sources, θ=90°, and the active power output by the single-stage isolated bidirectional charge/discharge converter is zero; when the load power is greater than the sum of the maximum powers of the plurality of input sources, the output voltage decreases, θ<90°, the single-stage isolated bidirectional charge/discharge converter outputs the active power, and the energy storage equipment supplies the insufficient power needed by the load; when the load power is less than the sum of the maximum powers of the plurality of input sources, the output voltage increases, θ>90°, the single-stage isolated bidirectional charge/discharge converter outputs a minus active power, and the rest of the power output by the plurality of input sources is supplied to charge the energy storage equipment.

* * * * *